(12) United States Patent
Lee et al.

(10) Patent No.: US 10,522,111 B2
(45) Date of Patent: Dec. 31, 2019

(54) METHOD AND ELECTRONIC APPARATUS FOR PROVIDING COMPOSITION SCREEN BY COMPOSING EXECUTION WINDOWS OF PLURALITY OF OPERATING SYSTEMS

(71) Applicant: SAMSUNG ELECTRONICS CO., LTD., Suwon-si (KR)

(72) Inventors: Sung-min Lee, Seoul (KR); Jae-yong Yoo, Yongin-si (KR); Min Kang, Seongnam-si (KR); Byung-chul So, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 35 days.

(21) Appl. No.: 15/606,518

(22) Filed: May 26, 2017

(65) Prior Publication Data

US 2017/0358278 A1 Dec. 14, 2017

(30) Foreign Application Priority Data

Jun. 8, 2016 (KR) ........................ 10-2016-0070980

(51) Int. Cl.
*G09G 5/14* (2006.01)
*G06T 11/00* (2006.01)
*G09G 5/00* (2006.01)
*G09G 5/37* (2006.01)
*G09G 5/36* (2006.01)

(52) U.S. Cl.
CPC .............. *G09G 5/14* (2013.01); *G06T 11/001* (2013.01); *G09G 5/001* (2013.01); *G09G 5/005* (2013.01); *G09G 5/363* (2013.01); *G09G 5/37* (2013.01); *G09G 2330/026* (2013.01); *G09G 2340/14* (2013.01); *G09G 2354/00* (2013.01); *G09G 2360/18* (2013.01)

(58) Field of Classification Search
None
See application file for complete search history.

(56) References Cited

U.S. PATENT DOCUMENTS

| 9,142,004 B2 | 9/2015 | Abiezzi et al. | |
|---|---|---|---|
| 2003/0067467 A1* | 4/2003 | Wilt | G09G 5/14 |
| | | | 345/473 |
| 2004/0189677 A1* | 9/2004 | Amann | G06F 3/1454 |
| | | | 345/660 |
| 2005/0210158 A1* | 9/2005 | Cowperthwaite | G06F 9/45558 |
| | | | 710/1 |

(Continued)

*Primary Examiner* — Yu Chen
(74) *Attorney, Agent, or Firm* — Sughrue Mion, PLLC

(57) ABSTRACT

An electronic apparatus and method of operating the electronic apparatus, to simultaneously display execution screen images of a first OS and a second OS are provided. The method includes obtaining screen image data of the second OS based on graphic data processed by the second OS; obtaining, by the first OS, at least one of control information related to the screen image data of the second OS and memory mapping information of the second OS; converting the screen image data of the second OS into graphic data of the first OS based on the at least one of the control information and the memory mapping information; generating screen image data of the first OS based on the graphic data of the first OS, the screen image data of the first OS including the screen image data of the second OS; and displaying the screen image data of the first OS.

17 Claims, 19 Drawing Sheets

(56) References Cited

U.S. PATENT DOCUMENTS

| | | | |
|---|---|---|---|
| 2010/0231599 A1* | 9/2010 | Tung | G06T 11/40 |
| | | | 345/522 |
| 2010/0253693 A1* | 10/2010 | Streatch | G06F 9/451 |
| | | | 345/548 |
| 2011/0234611 A1* | 9/2011 | Singhal | G06T 15/005 |
| | | | 345/582 |
| 2012/0081380 A1* | 4/2012 | Reeves | H04L 67/1095 |
| | | | 345/541 |
| 2012/0262463 A1* | 10/2012 | Bakalash | H04N 21/42653 |
| | | | 345/501 |
| 2012/0278750 A1* | 11/2012 | Abraham | G06F 9/451 |
| | | | 715/779 |
| 2013/0132971 A1* | 5/2013 | Assuncao | G06F 3/1462 |
| | | | 718/105 |
| 2014/0198122 A1 | 7/2014 | Grossman | |
| 2014/0376606 A1 | 12/2014 | Meier et al. | |
| 2015/0127716 A1* | 5/2015 | Agrawal | H04L 67/04 |
| | | | 709/203 |
| 2016/0328817 A1* | 11/2016 | Yin | G06T 1/20 |
| 2017/0046185 A1* | 2/2017 | Tsirkin | G06F 9/45558 |

* cited by examiner

METHOD AND ELECTRONIC APPARATUS FOR PROVIDING COMPOSITION SCREEN BY COMPOSING EXECUTION WINDOWS OF PLURALITY OF OPERATING SYSTEMS

CROSS-REFERENCE TO RELATED APPLICATION

This application claims priority from Korean Patent Application No. 10-2016-0070980, filed on Jun. 8, 2016 in the Korean Intellectual Property Office, the disclosure of which is incorporated herein in its entirety by reference.

BACKGROUND

1. Field

Methods and apparatuses consistent with exemplary embodiments relate to a method and an electronic apparatus for providing a composition screen by composing execution windows of a plurality of operating systems.

2. Description of the Related Art

Electronic apparatuses are able to execute various operating systems (OSs). For example, electronic apparatuses may execute Android, Tizen, Windows, iOS, macOS, or the like.

Electronic apparatuses are able to execute a plurality of OSs by using virtualization, which may configure an environment in which the plurality of OSs use identical hardware. For example, Android and Windows OSs can share and use a graphics processing unit (GPU) via virtualization.

SUMMARY

Exemplary embodiments prove methods and apparatuses for simultaneously displaying screen images of a plurality of operating systems.

Additional aspects will be set forth in part in the description which follows and, in part, will be apparent from the description, or may be learned by practice of various exemplary embodiments.

According to an aspect of an exemplary embodiment, a method of simultaneously displaying execution screen images of a plurality of operating systems (OSs) executed by an electronic apparatus, may include: obtaining screen image data of at least one guest OS among the plurality of OSs based on graphic data of the at least one guest OS processed by the at least one guest OS; obtaining, by a host OS among the plurality of Oss, at least one of control information related to the screen image data of the at least one guest OS and memory mapping information of the at least one guest OS; converting the screen image data of the at least one guest OS into graphic data of the host OS based on the at least one of the control information and the memory mapping information; generating screen image data of the host OS based on the graphic data of the host OS, the screen image data of the host OS including the screen image data of the at least one guest OS; and displaying the screen image data of the host OS.

The converting of the screen image data of the at least one guest OS may include: obtaining address information of a memory region for storing the screen image data of the at least one guest OS based on the at least one of the control information and the memory mapping information; and generating a texture object of the host OS, the texture object corresponding to the memory region for storing the screen image data of the at least one guest OS based on the obtained address information.

The converting of the screen image data of the at least one guest OS may further include transforming a format of the texture object in response to a data format of the memory region for storing the screen image data of the at least one guest OS being different from a data format of a memory region for storing the screen image data of the host OS.

The texture object may be generated after the host OS receives a signal indicating that the screen image data of the at least one guest OS is completely stored in the memory region.

The at least one of the control information and the memory mapping information may be provided from the at least one guest OS to the host OS through a hypervisor.

The screen image data of the at least one guest OS may be pixel data stored in a frame buffer.

The frame buffer may identify a region that stores the screen image data of the host OS and a region for storing the screen image data of the at least one guest OS.

The screen image data of the host OS and the screen image data of the at least one guest OS may be renewed at different refresh rates based on at least one of workload of each of the plurality and OSs or a user input value.

The displaying of the screen image data of the host OS may include displaying the screen image of the host OS by using a sub-window.

The control information related to the screen image data of the at least one guest OS may be for at least one of generating the screen image data of the at least one guest OS and outputting the screen image data of the at least one guest OS.

The memory mapping information may include one of a whole and a part of a page table of the at least one guest OS.

According to an aspect of another exemplary embodiment, an electronic apparatus for driving a plurality of OSs may include: a display; a graphics processor configured to generate screen image data of at least one guest OS based on graphic data of the at least one guest OS processed by the at least one guest OS among the plurality of OSs; and a processor configured to provide a host OS among the plurality of OSs with at least one of control information related to the screen image data of the at least one guest OS and memory mapping information of the at least one guest OS and convert the screen image data of the at least one guest OS into graphic data of the host OS based on the at least one of the control information and the memory mapping information. The graphics processor may be further configured to generate screen image data of the host OS based on the graphic data of the host OS, the screen image data of the host OS including the screen image data of the at least one guest OS. The display may be configured to display the screen image data of the host OS.

According to an aspect of another exemplary embodiment, a non-transitory computer-readable storage medium has stored thereon a program which, when executed by a computer, performs a method including: obtaining screen image data of at least one guest OS among the plurality of OSs based on graphic data of the at least one guest OS processed by the at least one guest OS; obtaining at least one of control information related to the screen image data of the at least one guest OS and memory mapping information of the at least one guest OS, wherein the obtaining is performed by a host OS among the plurality of OSs; converting the screen image data of the at least one guest OS into graphic data of the host OS based on the at least one of the control information and the memory mapping information; generating screen image data of the host OS based on the graphic data of the host OS, the screen image data of the host OS including the screen image data of the at least one guest OS; and displaying the screen image data of the host OS.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
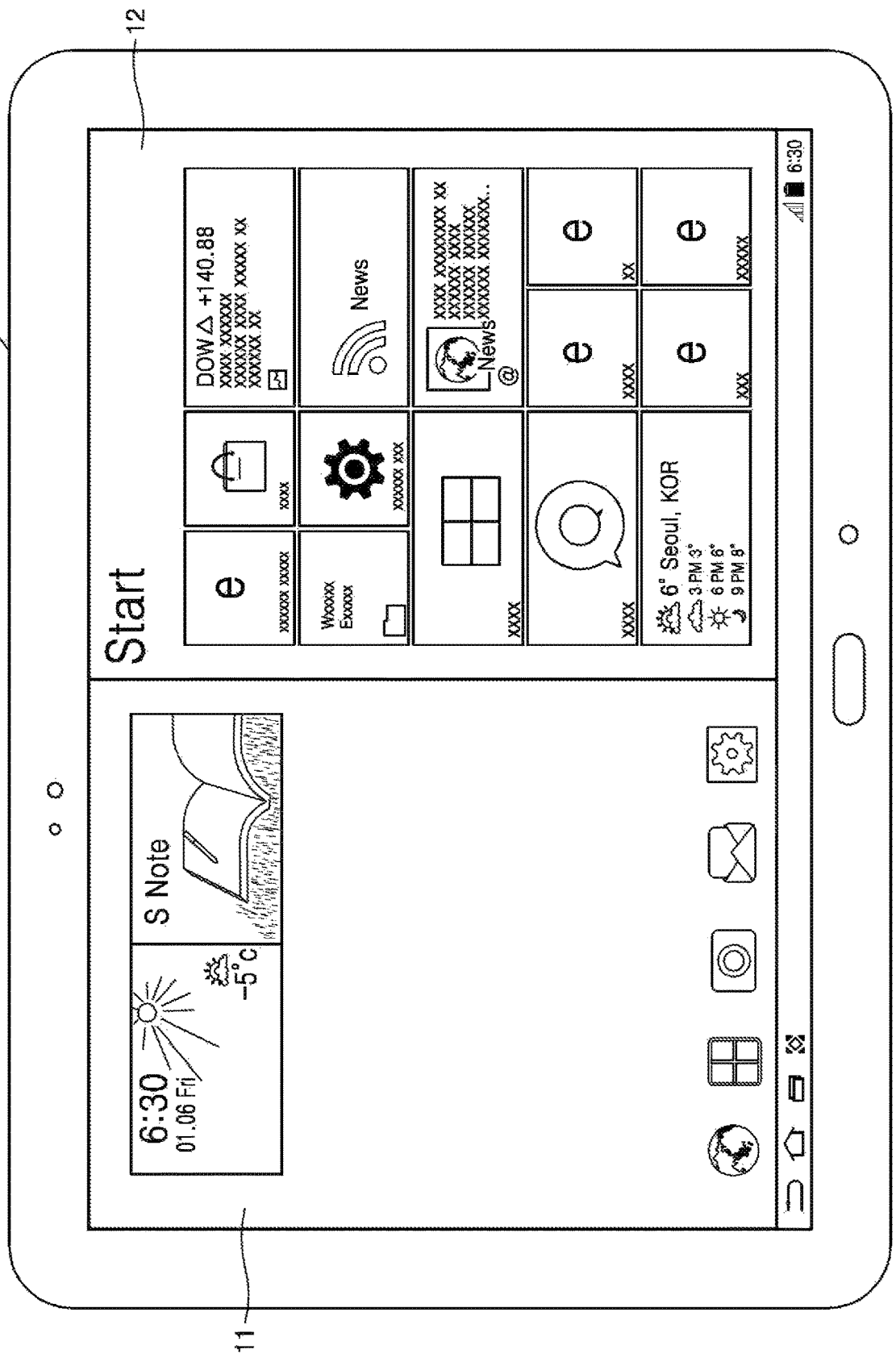
FIG. 1 is a schematic view for explaining a method of displaying a screen image, according to an exemplary embodiment.

Reference will now be made in detail to exemplary embodiments, which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

The terms used herein will be described in brief, and the exemplary embodiments will be described in detail.

It will be understood that, although the terms "first" and "second," etc., may be used herein to describe various components, these components should not be limited by these terms. These terms are only used to distinguish one component from another component. For example, a first component discussed below may be termed a second component without departing from the scope of the present disclosure.

The terms used herein are general terms that are currently widely used in consideration of functions in the exemplary embodiments but may vary according to intentions of those of ordinary skill in the art, precedents, new technologies being introduced, or the like. Also, the applicant may arbitrarily select terms in a particular case, and meanings of the terms corresponding to this case will be described in detail in the description of the exemplary embodiments. Therefore, the terms used herein may be defined based on meanings thereof and the overall contents of the exemplary embodiments not based on names of simple terms. The term "and/or" includes any and all combinations of one or more of the associated listed items.

When a part "comprises" an element in the specification, this may mean that the part may not exclude and may further include other elements as long as there is no contrary description. The term "unit" used herein refers to a hardware element such as field-programmable gate array (FPGA) or application-specific integrated circuit (ASIC) and performs any role. However, the term "unit" is not limited to software or hardware. The "unit" may be constituted to be in a storage medium that may be addressed or may be constituted to play one or more processors. Therefore, for example, the "unit" includes elements, such as software elements, object-oriented elements, class elements, and task elements, processes, functions, attributes, procedures, sub routines, segments of a program code, drivers, firmware, a microcode, a circuit, data, a database (DB), data structures, tables, arrays, and parameters. Functions provided in elements and "units" may be combined as the smaller number of elements and "units" or may be separated as additional elements and "units."

FIG. 1 is a schematic view for explaining a method of displaying a screen image, according to embodiments.

Referring to FIG. 1, an electronic apparatus 10 may simultaneously execute a plurality of operating systems (OSs). For example, the electronic apparatus 10 may simultaneously execute an Android OS and a Windows OS. For example, when the electronic apparatus 10 includes a graphics processor for processing graphic data, for example, a graphics processing unit (GPU), the electronic apparatus 10 may perform a GPU virtualization operation to perform image processing (for example, a rendering job) on graphic data processed by a plurality of OSs that are being currently executed by the GPU. According to an aspect of an exemplary embodiment, the electronic device 10 may compose the graphic data processed by the plurality of OSs by using address information of a frame buffer, thereby simultaneously displaying screen images of the plurality of OSs. For example, as shown in FIG. 1, the electronic apparatus 10 may display an Android screen image 11 of the Android OS and a Windows screen image 12 of the Windows OS.

The plurality of OSs may be the same type or different types of OSs. Also, although the plurality of OSs are currently executed in the electronic apparatus 10, screen images of a plurality of OSs executed by another apparatus may be displayed together. In this case, the electronic apparatus 10 may include an interface for transmitting and receiving data to and from another apparatus.

Also, the electronic apparatus 10 may be a mobile phone, a smart phone, a wearable device, a tablet, a camera, a laptop computer, a desktop computer, a television (TV), a smart TV, or the like, but embodiments are not limited thereto. The electronic apparatus 10 may be one of various apparatuses capable of image processing on graphic data.

Figure 2:
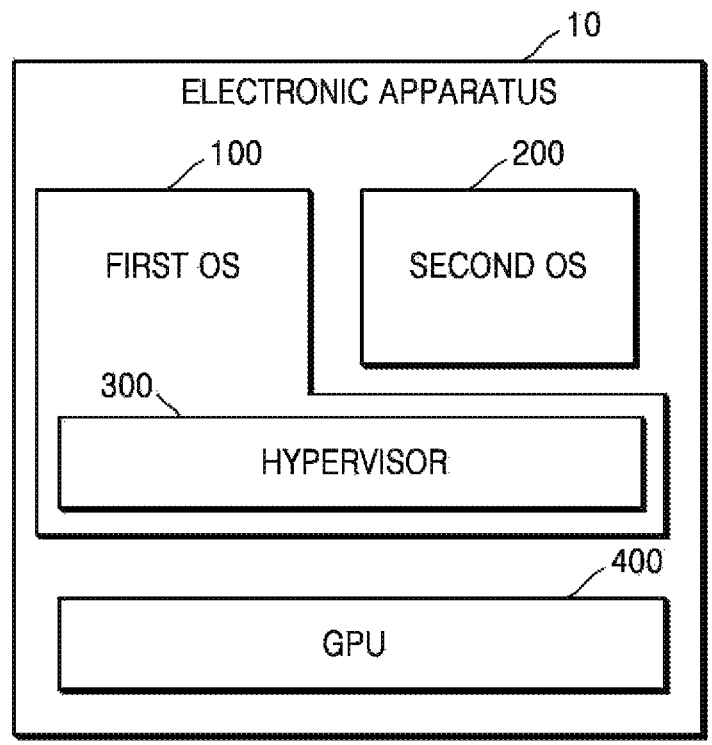
FIG. 2 is a block diagram of an electronic apparatus according to an exemplary embodiment.

FIG. 2 is a block diagram of the electronic apparatus 10 according to an exemplary embodiment. Various components, modules, and units described in FIG. 2 and other figures may be implemented with software, hardware, or a combination of both. Referring to FIG. 2, the electronic apparatus 10 may include a first OS 100, a second OS 200, a hypervisor 300, and a GPU 400. The electronic apparatus 10 may further include a display. Herein, for convenience of description, the electronic apparatus 10 includes the first OS 100 and the second OS 200 but embodiments are not limited thereto. The electronic apparatus 10 may include a plurality of OSs (e.g., first through N-th OSs). In this case, the third through N-th OSs may operate identically and/or similarly to the second OS 200. Thus, an operation of each of the third through N-th OSs may correspond to an operation of the second OS 200. The first OS 100 and the second OS 200 may be executed by the electronic apparatus 10. For example, the first OS 100 and the second OS 200 may be Android, Tizen, Windows, Linux, iOS, macOS, or Nucleus, etc., but embodiments are not limited thereto.

The first OS 100 may be a host OS, and the second OS 200 may be a guest OS. In this case, the first OS 100 may control components of the electronic apparatus 10. Also, the first OS 100 may include the hypervisor 300. The hypervisor 300 may provide a virtual environment in which the first OS 100 and the second OS 200 are able to use the components of the electronic apparatus 10. For example, the hypervisor 300 may perform scheduling between the first OS 100 and the second OS 200 that access the GPU 400. Also, the second OS 200 may be a virtual OS and may control the components (for example, the GPU 400, the display, etc.) of the electronic apparatus 10 through the hypervisor 300.

To simultaneously output screen images of the host OS and the guest OS, the electronic apparatus 10 may transmit graphic data processed by the guest OS to the host OS and transmit graphic data composed by the host OS to the GPU 400. In this case, overhead may occur by transmitting the graphic data processed by the guest OS to the host OS. Thus, it may be difficult to simultaneously display application programs requiring a high frames per second (FPS) such as game, reproduction of a movie, etc. According to an aspect of an exemplary embodiment, the electronic apparatus 10 may simultaneously display the screen images of the host OS and the guest OS without needing to transmit the graphic data processed by the guest OS to the host OS.

According to an aspect of an exemplary embodiment, the electronic apparatus 10 may generate screen image data of the second OS 200 from graphic data processed by the second OS 200. In this regard, the graphic data may be data processed by an OS and provided to the GPU 400. For example, the graphic data may include vertex data, texture data, etc. but is not limited thereto. Also, the screen image data may be processed values obtained by image processing the graphic data provided from the OS in the GPU 400 and may include pixel data that may be output by the display. In other words, an OS may provide raw data such as the graphic data to the GPU 400, and the GPU 400 converts the graphic data into screen image data that represent coordinates, colors, etc. for each of the pixels displayed on the screen. The pixel data may be a pixel map.

For example, the second OS 200 may generate control information related to the screen image data of the second OS 200. The control information related to the screen image data may include control information for generating the screen image data from the graphic data and control information for outputting the generated screen image data. For example, the control information related to the screen image data of the second OS 200 may include a GPU register value (for example, an address value of a frame buffer, etc.) set by the second OS 200, GPU scheduling information, a display register value, display scheduling information, etc. Thus, the second OS 200 may provide the graphic data and the control information to the GPU 400 to generate the screen image data of the second OS 200. In this regard, the graphic data may be directly provided from the OS to the GPU 400 (i.e. pass-through access), and the control information related to the screen image data may be provided to the GPU 400 through the hypervisor 300 (i.e. mediated access).

According to an exemplary embodiment, the hypervisor 300 may manage the control information related to the screen image data of the second OS 200 obtained from the second OS 200. The hypervisor 300 may provide the control information for generating the screen image data of the second OS 200 to the GPU 400 to allow the screen image data of the second OS 200 to be generated. Also, the hypervisor 300 may provide the control information related to the screen image data to the first OS 100. For example, if the screen image data of the second OS 200 is generated, the hypervisor 300 may not output the screen image data through the display and may provide the control information to the first OS 100.

Also, the hypervisor 300 may obtain and provide memory mapping information of the second OS 200 to the first OS 100. The memory mapping information may wholly or partially include a page table of the OS.

According to an exemplary embodiment, the first OS 100 may obtain at least one of the control information related to the screen image data and the memory mapping information of the second OS 200. For example, the first OS 100 may obtain the control information and the memory mapping information of the second OS 200 from the hypervisor 300.

The first OS 100 may convert the screen image data of the second OS 200 into graphic data of the first OS 100 based on at least one of the control information and the memory mapping information of the second OS 200. For example, the first OS 100 may obtain address information in which the screen image data of the second OS 200 is stored based on the control information and the memory mapping information of the second OS 200. The screen image data of the second OS 200 may be stored in a previously designated address space of the second OS 200 by the GPU 400. For example, the previously designated address space may be a frame buffer of the GPU 400. In this regard, the frame buffer may identify a region that stores screen image data of each OS. Thus, the frame buffer may identify a region that stores screen image data of the first OS 100 and the screen image data of the second OS 200.

Specifically, the first OS 100 may generate a texture object corresponding to a memory region that stores the screen image data of the second OS 200 by using the address information in which the screen image data of the second OS 200 is stored. The texture object may include information about texture data processed by the GPU 400. The first OS 100 may allocate the memory region that stores the screen image data of the second OS 200 to the texture object.

Also, the first object 100 may determine a format of the texture object based on a form by which the screen image data of the second OS 200 is stored. For example, a memory region that is to store the screen image data of the first OS 100 and the memory region that stores the screen image data of the second OS 200 may have different data formats. For example, when a frame buffer of the second OS 200 stores data in format X and a frame buffer of the first OS 100 stores data in format Y, the first OS 100 may transform the format of the texture object to the format Y but is not limited thereto. The first OS 100 may transform the format of the texture object to the format X to store the data in the frame buffer of the first OS 100 again. Also, although the first OS 100 transforms the format of the texture object, the hypervisor 300 or the GPU 400 may transform the format of the texture object.

According to an exemplary embodiment, the first OS 100 may generate the screen image data of the first OS 100 including the screen image data of the second OS 200 from the graphic data of the first OS 100. For example, the first OS 100 may transmit the graphic data of the first OS 100 including the texture object corresponding to the screen image data of the second OS 200 to the GPU 400 to generate the screen image data of the first OS 100 including the screen image data of the second OS 200. In this regard, control information related to the screen image data of the first OS 100 may be provided to the hypervisor 300.

The hypervisor 300 may provide control information for generating the screen image data among the control information obtained from the first OS 100 to the GPU 400. Also, if the screen image data of the first OS 100 is generated by the GPU 400, the hypervisor 300 may provide control information for outputting the screen image data of the first OS 100 to the display. In this regard, the screen image data of the first OS 100 may be stored in the frame buffer of the first OS 100.

The display may display the screen image data of the first OS 100 stored in the frame buffer according to the control information.

As described above, the electronic apparatus 10 may allow the first OS 100 to access the frame buffer of the second OS 200 that stores the screen image data of the second OS 200, thereby simultaneously outputting the screen image data of the second OS 200 and the first OS 100.

The hypervisor 300 includes the first OS 100 in FIG. 2 but embodiments are not limited thereto. As will be described later in FIG. 3, the hypervisor 300 may be independent from the first OS 100. Also, two OSs are simultaneously executed in FIG. 2 but embodiments are not limited thereto. Two or more OSs may be simultaneously executed. In this case, additional OSs may perform identical or similar operations to the second OS 200.

Also, the electronic apparatus 10 may not include the hypervisor 300. In this case, the first OS 100 may perform an identical or similar function to the hypervisor 300 described above. The first OS 100 may obtain the control information related to the screen image data and the memory mapping information of the second OS 200 directly from the second OS 200.

Figure 3:
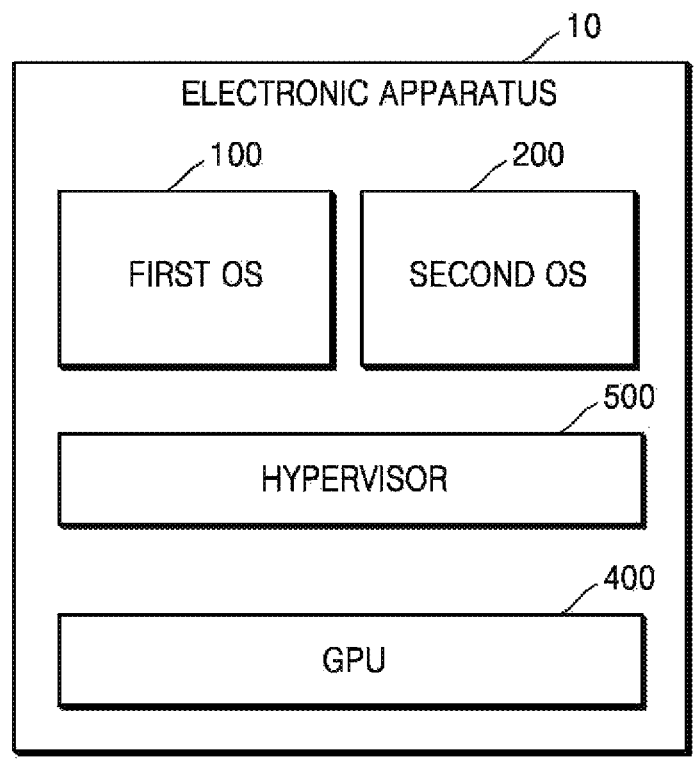
FIG. 3 is a block diagram of an electronic apparatus according to an exemplary embodiment.

FIG. 3 is a block diagram of the electronic apparatus 10 according to an exemplary embodiment.

Referring to FIG. 3, the electronic apparatus 10 may include the first OS 100, the second OS 200, a hypervisor 500 independent from the first OS 100 and the second OS 200, and the GPU 400. In this regard, the first OS 100 and the second OS 200 may be guest OSs. Thus, the first OS 100 may perform an identical or similar function to the second OS 200, and the hypervisor 500 may partially or wholly perform an operation of a host OS.

For example, the hypervisor 500 may obtain memory mapping information and control information related to screen image data of each of the first OS 100 and the second OS 200 from the first OS 100 and the second OS 200. In this case, the hypervisor 500 may perform an identical or similar function to the first OS 100 of FIG. 2. For example, the hypervisor 500 may convert the screen image data of the second OS 200 into graphic data of the first OS 100 by using the obtained memory mapping information and control information. Thereafter, the hypervisor 500 may control the GPU 400 and a display to allow screen image data generated from the graphic data of the first OS 100 to be output.

Alternatively, the hypervisor 500 may convert the screen image data of the first OS 100 into graphic data of the second OS 200. In this case, the hypervisor 500 may control the GPU 400 and the display to allow screen image data generated from the graphic data of the second OS 200 to be output. Exemplary embodiments below will be described based on a configuration of the electronic apparatus 10 of FIG. 2. However, it will be easily understood by one of ordinary skill in the art that the exemplary embodiments below may relate to a configuration of the electronic apparatus 10 of FIG. 3.

Figure 4:
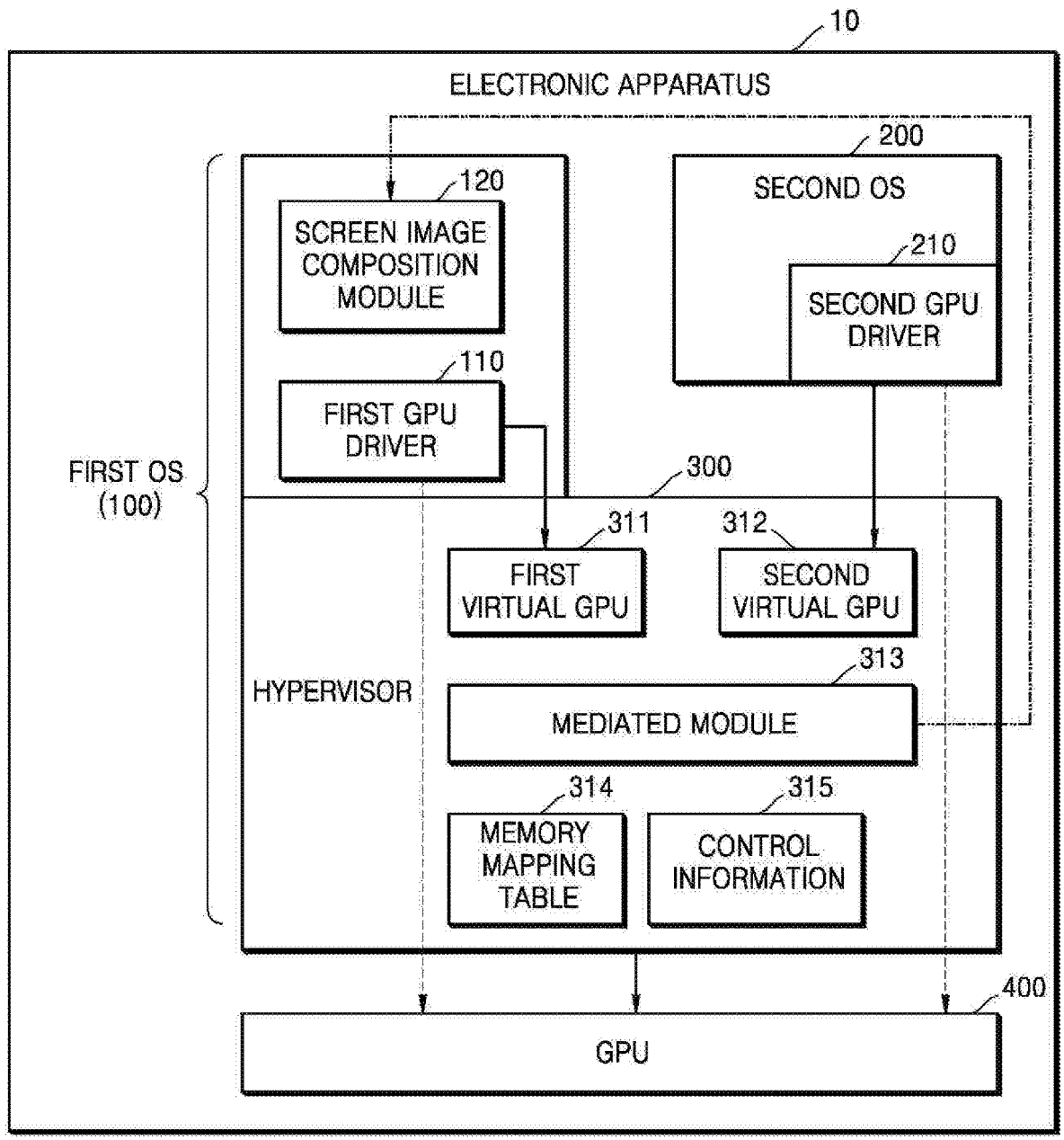
FIG. 4 is a block diagram for describing an operation where a first operating system (OS) obtains control information related to screen image data and memory mapping information of a second OS according to an exemplary embodiment.

FIG. 4 is a block diagram for describing an operation where the first OS 100 obtains control information related to screen image data and memory mapping information of the second OS 200 according to an exemplary embodiment.

Referring to FIG. 4, the first OS 100 may include a first GPU driver 110 and a screen image composition module 120, and the second OS 200 may include a second GPU driver 210. Also, the hypervisor 300 may include a first virtual GPU 311, a second virtual GPU 312, and a mediated module 313.

The first GPU driver 110 of the first OS 100 may generate control information for generating screen image data of the first OS 100 from graphic data processed by the first OS 100. The second GPU driver 210 of the second OS 200 may generate control information for generating screen image data of the second OS 200 from graphic data processed by the second OS 200.

The first and second virtual GPUs 311 and 312 of the hypervisor 300 may obtain control information related to the screen image data of the first OS 100 and the second OS 200, and transmit the obtained control information to the mediated module 313. For example, the first and second virtual GPUs 311 and 312 may obtain the control information from the first and second GPU drivers 110 and 210. Alternatively, the first and second virtual GPUs 311 and 312 may hook (e.g., intercept) access of the first and second GPU drivers 110 and 210 to the GPU 400 to obtain the control information.

Only the first and second virtual GPUs 311 and 312 are shown in FIG. 4 but embodiments are not limited thereto. The hypervisor 300 may further include virtual devices corresponding to various apparatus drivers for controlling hardware of the electronic apparatus 10. For example, the hypervisor 300 may further include a virtual display module when the first and second OSs 100 and 200 include display drivers.

The memory mapping table 314 may manage a memory mapping table obtained from the second OS 200. For example, the hypervisor 300 may hook a kernel of the second OS 200 to obtain a memory mapping table of the second OS 200. Alternatively, the hypervisor 300 may obtain the memory mapping table from the second OS 200.

Control information 315 may comprise the control information obtained from the second OS 200. For example, the control information 315 may comprise control information for generating screen image data of the second OS 200 and control information for outputting screen image data of the second OS 200.

The mediated module 313 may schedule hardware of the electronic apparatus 10 based on an OS executed in the foreground. For example, when one of the first OS 100 and the second OS 200 is executed in the foreground, the mediated module 313 may transmit control information of the executed first OS 100 or second OS 200 to the GPU 400. Also, a display may output screen image data of an OS generated in the GPU 400 by the mediated module 313.

Also, when the first OS 100 and the second OS 200 are simultaneously executed in the foreground, the mediated module 313 may provide the memory mapping table and the control information of the second OS 200 that are respectively managed by the memory mapping table 314 and the control information 315 to the screen image composition module 120 of the first OS 100.

The screen image composition module 120 may convert the screen image data of the second OS 200 into graphic data of the first OS 100 by using the memory mapping table and the control information that are obtained from the mediated module 313. For example, the screen image composition module 120 may designate the screen image data of the second OS 200 as texture data of the first OS 100 by using address information of a frame buffer that stores the screen image data of the second OS 200.

Figure 5:
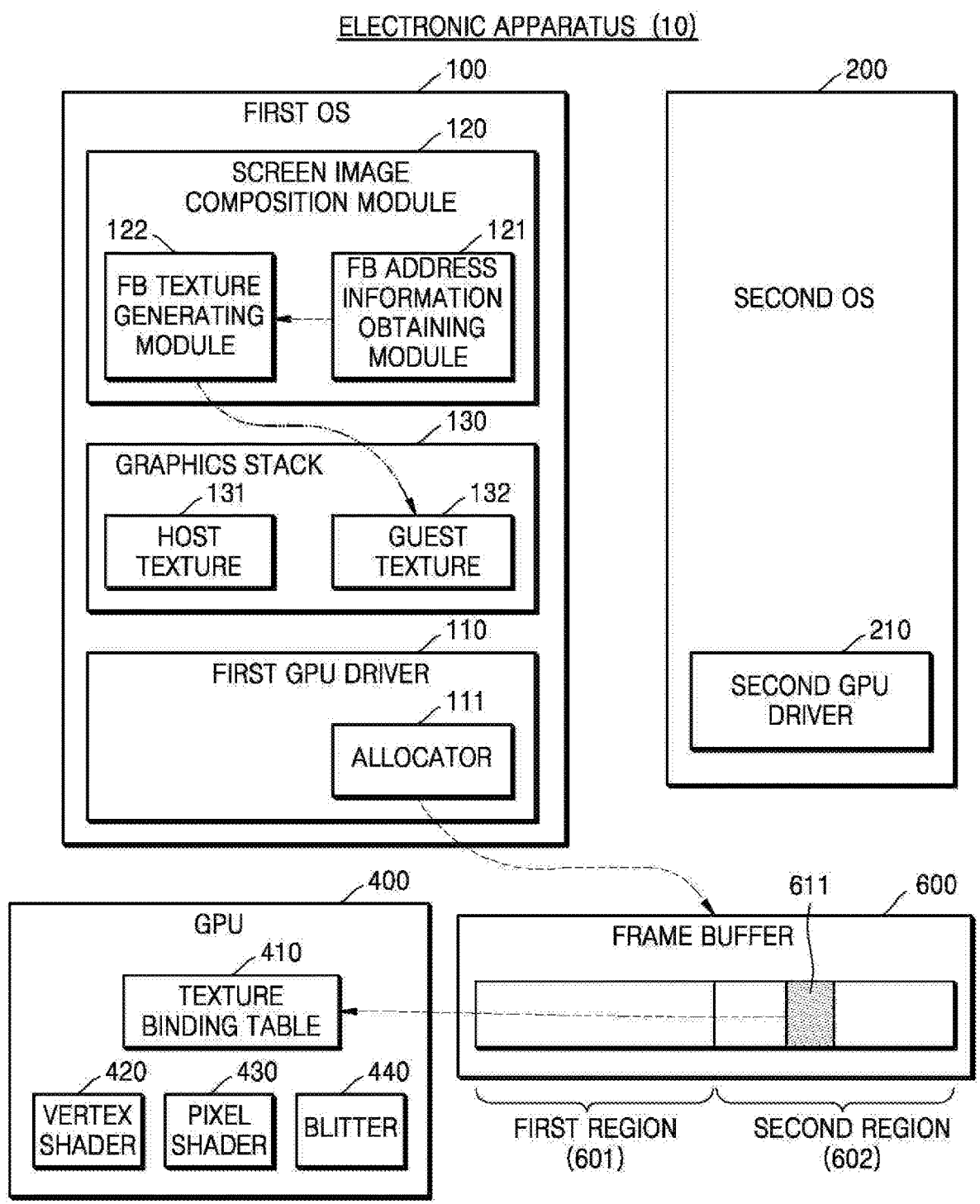
FIG. 5 is a block diagram for describing an operation where an electronic apparatus generates graphic data of a first OS including screen image data of a second OS according to an exemplary embodiment.

FIG. 5 is a block diagram for describing an operation where the electronic apparatus 10 generates graphic data of the first OS 100 including screen image data of the second OS 200 according to an exemplary embodiment.

Referring to FIG. 5, the first OS 100 may generate the graphic data thereof including the screen image data of the second OS 200 by using address information of a frame buffer 600 that stores image screen data of the second OS 200.

The frame buffer 600 may be a memory space that temporarily stores screen image data of each of the first and second OSs 100 and 200 generated by the GPU 400, for example, a whole or a part of graphic memory or main memory. The frame buffer 600 may include regions identified for each of the first and second OSs 100 and 200. For example, the frame buffer 600 may include a first region 601 that stores the screen image data of the first OS 100 and a second region 602 that stores the image screen data of the second OS 200. For example, a shaded region 611 (i.e., a region of the frame buffer 600 represented in FIG. 5 with shading) of the second region 602 may be a region that stores the image screen data of the second OS 200.

The first OS 100 may include the screen image composition module 120, a graphics stack 130, and the first GPU driver 110. The screen image composition module 120 may include a frame buffer (FB) address information obtaining module 121 and a FB texture generating module 122. The graphics stack 130 may include a host texture 131 and a guest texture 132. The first GPU driver 110 may include an allocator 111.

The second GPU driver 210 of the second OS 200 may generate control information for generating and/or outputting the screen image data of the second OS 200 from the graphic data processed by the second OS 200. Also, the second GPU driver 210 may transmit the graphic data to the GPU 400. The control information generated by the second GPU driver 210 may be hooked by or directly transmitted to the second virtual GPU 312.

The FB address information obtaining module 121 may obtain control information and memory mapping information of the second OS 200 from the mediated module 313 of the hypervisor 300. The FB address information obtaining module 121 may obtain address information of the shaded region 611 of the frame buffer 600 that stores the screen image data of the second OS 200 from the obtained control information. For example, the FB address information obtaining module 121 may obtain the address information of the shaded region 611 from a GPU register value.

Also, the FB address information obtaining module 121 may convert the obtained address information into an address system of the first OS 100 based on the memory mapping information of the second OS 200. The FB address information obtaining module 121 may provide the converted address information to the FB texture generating module 122. An operation of converting the address information in the FB address information obtaining module 121 will be described in more detail with reference to FIG. 7 below.

The FB texture generating module 122 may generate texture by using the address information of the shaded region 611 obtained from the FB address information obtaining module 121. For example, the FB texture generating module 122 may generate a texture object and allocate the generated texture object to the shaded region 611. For example, the FB texture generating module 122 may allocate the shaded region 611 to the texture object through the allocator 111 of the first GPU driver 110. In this regard, the first OS 100 may include authorization information for accessing the second region 602 of the frame buffer 600. Through this job, the screen image data of the second OS 200 stored in the shaded region 611 may be converted into texture (i.e. the graphic data of the first OS 100) controllable by the first OS 100.

Also, the FB texture generating module 122 may determine a size and a location of the output texture object by using control information (for example, control information for outputting the screen image data of the second OS 200) of the second OS 200 or user input information.

Also, the FB texture generating module 122 may provide the generated texture object to the graphics stack 130 of the first OS 100. As described above, the FB texture generating module 122 may designate a memory space (i.e., the shaded region 611) that stores the screen image data of the second OS 200 as a texture buffer of the first OS 100, and thus the screen image data of the second OS 200 may be composed with the graphic data of the first OS 100.

The graphics stack 130 may include a host texture 131 and a guest texture 132. The host texture 131 may manage the texture object generated from the graphic data processed by the first OS 100. The guest texture 132 may manage texture objects stored in the second region 602 of the frame buffer 600.

The allocator 111 may allocate the memory space to the texture object and provide address information of the allocated memory space to the GPU 400. For example, the allocator 111 may allocate the shaded region 611 to the texture object according to instructions of the FB texture generating module 122 and provide address information of the shaded region 611 to the GPU 400.

The GPU 400 may include at least one of a texture binding table 410, a vertex shader 420, a pixel shader 430, and a blitter 440. The GPU 400 may generate screen image data displayed on a window and store the generated screen image data in the frame buffer 600.

The texture binding table 410 may include information about texture. For example, the texture biding table 410 may store address information in which textures to be processed with respect to run time are stored. Thus, the address information of the shaded region 611 that stores the screen image data of the second OS 200 may be managed by the texture binding table 410 by the first OS 100.

According to an exemplary embodiment, the GPU 400 may further include a texture format changing module. The texture format changing module may convert a format of texture when the format of texture is not consistent with a format of texture supported by the GPU 400.

Figure 6:
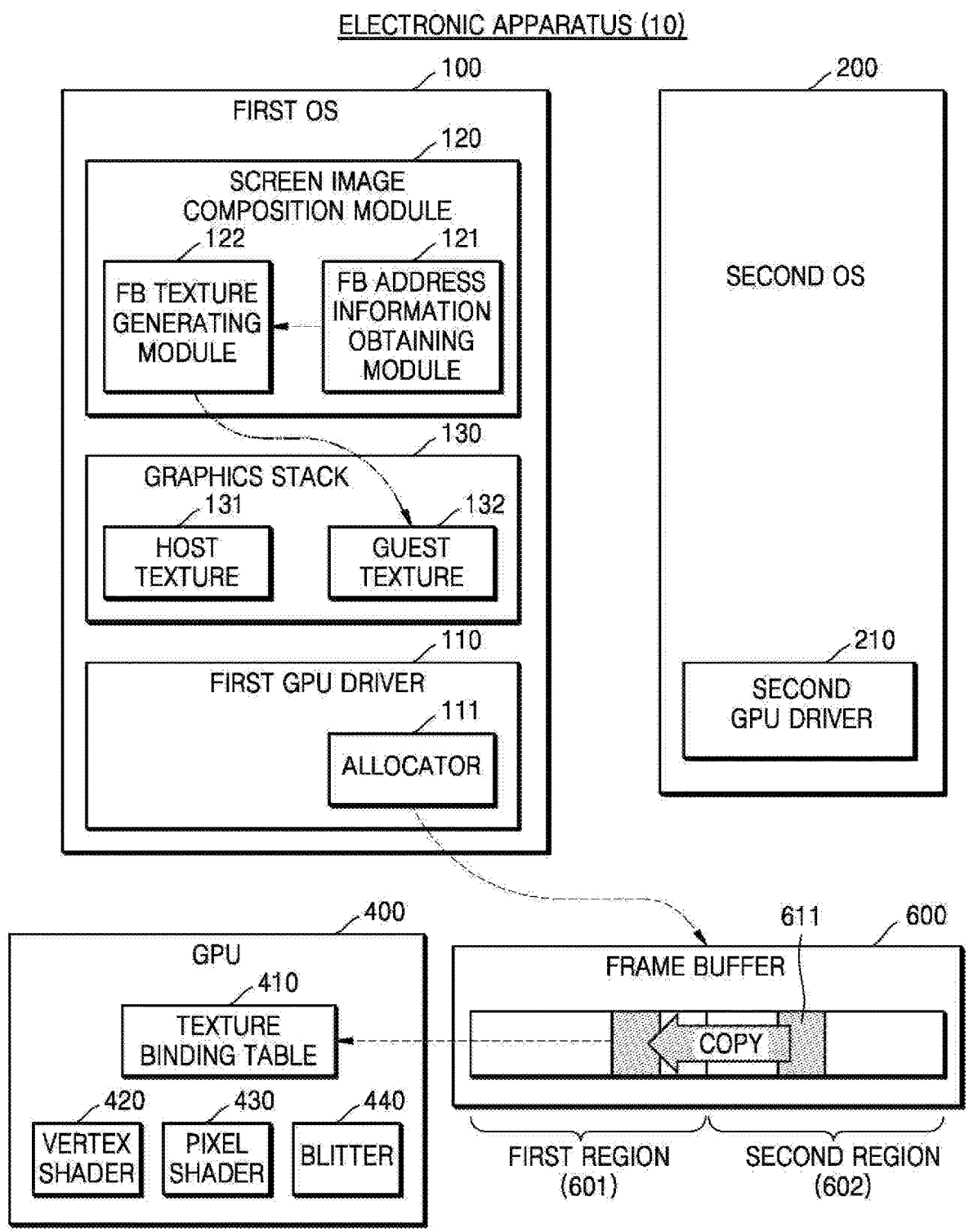
FIG. 6 is a block diagram for describing an operation where an electronic apparatus generates graphic data of a first OS including screen image data of a second OS according to an exemplary embodiment.

FIG. 6 is a block diagram for describing an operation that the electronic apparatus 10 generates graphic data of the first OS 100 including screen image data of the second OS 200 according to other embodiments.

Referring to FIG. 6, the electronic apparatus 10 may copy screen image data of the second OS 200 stored in the second region 602 of the frame buffer 600 to the first region 601, thereby generating screen image data of the first OS 100 including the screen image data of the second OS 200.

For example, the FB texture generating module 122 may copy the screen image data of the second OS 200 stored in the shaded region 611 of the second region 602 to the first region 601. In this regard, the FB texture generating module 122 may transform a format of the screen image data of the second OS 200 stored in the shaded region 611 to copy the screen image data of the second OS 200 to the first region 601. In this regard, the FB texture generating module 122 may transform the format of the screen image data of the second OS 200 based on a data format supported by the first OS 100.

The FB texture generating module 122 may generate a texture object having the screen image data of the second OS 200 copied to the first region 601 as texture. Thus, the allocator 111 may provide address information of the first region 601 to the GPU 400.

The GPU 400 may generate screen image data of the first OS 100 including the screen image data of the second OS 200 stored in the first region 601. In this case, the GPU 400 may not access the second region 602.

Figure 7:
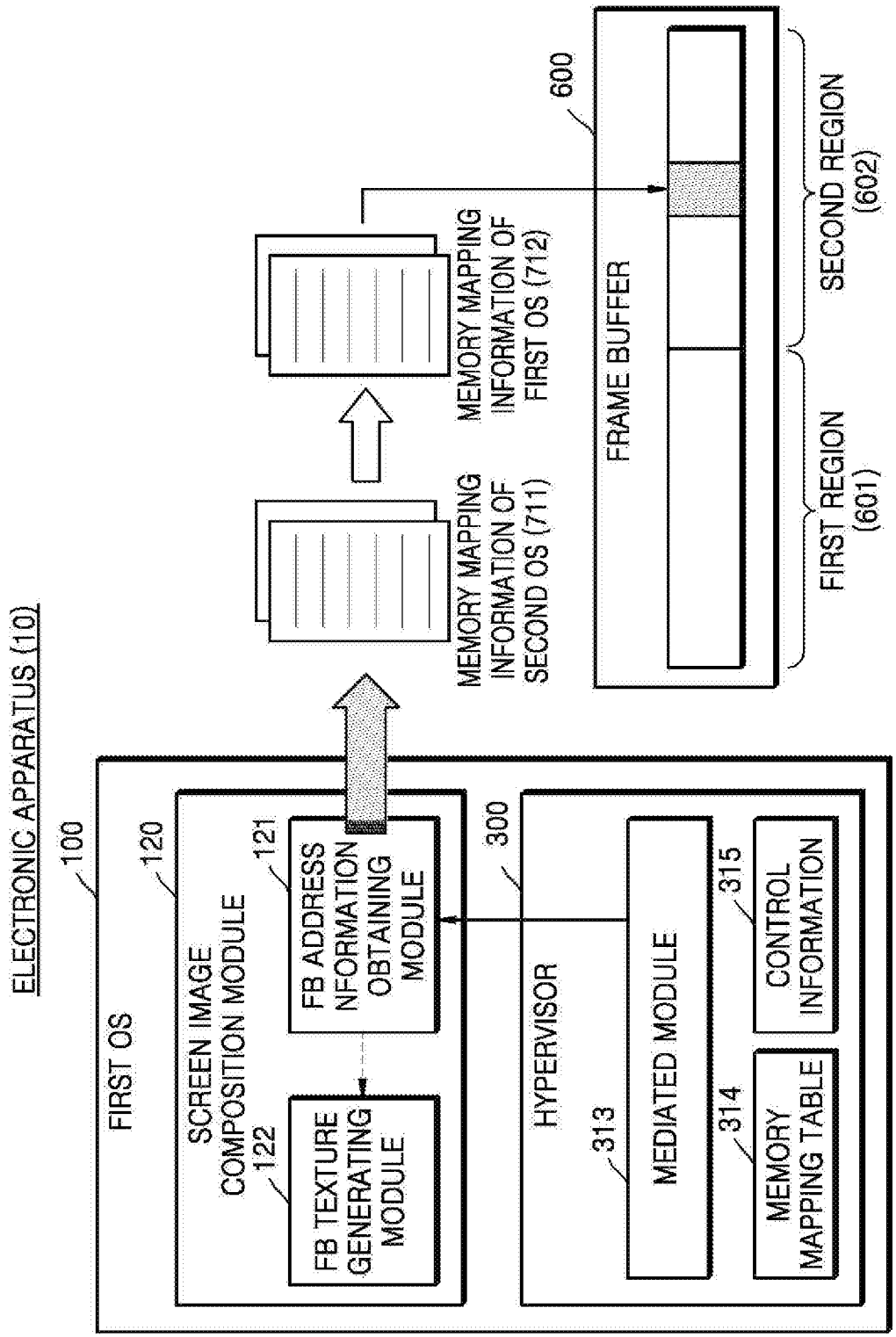
FIG. 7 is a block diagram of an example of obtaining address information of a frame buffer that stores screen image data of a second OS according to an exemplary embodiment.

FIG. 7 is a block diagram of an example of obtaining address information of the frame buffer 600 that stores screen image data of the second OS 200 according to an exemplary embodiment.

Referring to FIG. 7, the electronic apparatus 10 may obtain the address information of the frame buffer 600 that stores the screen image data of the second OS 200 in order to access the screen image data of the second OS 200.

If the mediated module 313 of the hypervisor 300 obtains control information and memory mapping information 711 of the second OS 200, the mediated module 313 may provide the control information and the memory mapping information 711 of the second OS 200 to the FB address information obtaining module 121.

The FB address information obtaining module 121 may obtain the address information of the frame buffer 600 that stores the screen image data of the second OS 200 from the control information of the second OS 200. The obtained address information may be based on an address system of the second OS 200. Thus, the FB address information obtaining module 121 may obtain a physical address of the obtained address information based on the memory mapping information 711 of the second OS 200 and may convert the physical address into an address system of the first OS 100 based on memory mapping information 712 of the first OS 100.

The FB address information obtaining module 121 converts the address information of the frame buffer 600 that stores the screen image data of the second OS 200 into the address system of the first OS 100 in FIG. 7 but embodiments are not limited thereto. For example, the hypervisor 300 may perform the above-described operation.

Figure 8:
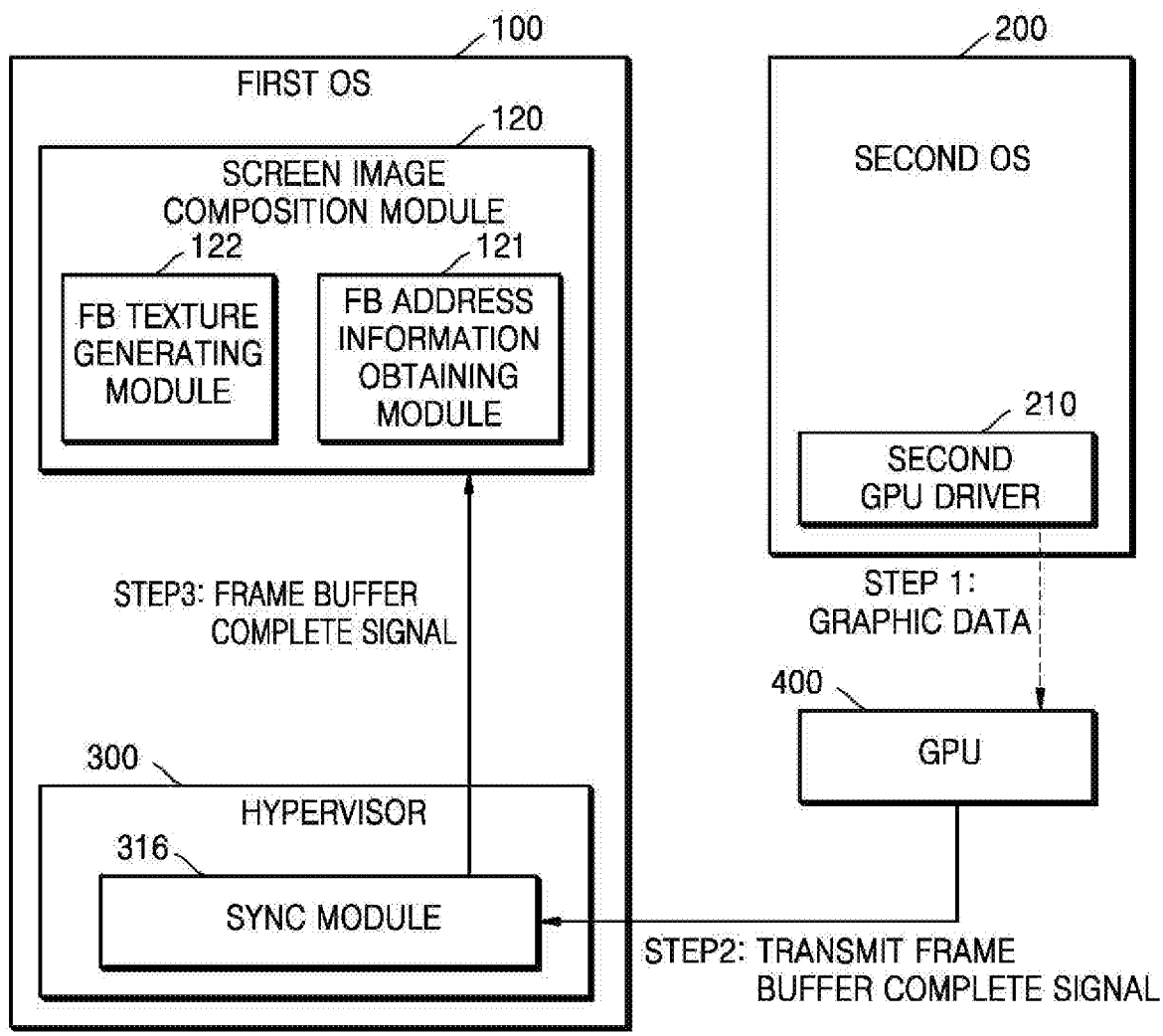
FIG. 8 is a block diagram for describing an operation of determining time when a first OS obtains address information in which screen image data of a second OS is stored according to an exemplary embodiment.

FIG. 8 is a block diagram for describing an operation of determining time when the first OS 100 obtains address information in which screen image data of the second OS 200 is stored according to an exemplary embodiment.

Referring to FIG. 8, after the GPU 400 generates the screen image data of the second OS 200 in the frame buffer 600, the first OS 100 may use the screen image data of the second OS 200 as graphic data of the first OS 100. If the first OS 100 attempts to access the frame buffer 600 (i.e., when a texture object is allocated) before the data is completely stored in the frame buffer 600, undesirable visual artifacts such as tearing may occur on the screen. Thus, after receiving a frame buffer complete signal, the first OS 100 may allocate an address region of the frame buffer 600 that stores the screen image data of the second OS 200 in the texture object.

Step 1: The second OS 200 may directly transmit graphic data processed by the second OS 200 to the GPU 400.

Step 2: A sync module 316 of the hypervisor 300 may receive the frame buffer complete signal indicating that rendering result values with respect to the graphic data are stored in the frame buffer 600 from the GPU 400.

Step 3: The screen image composing module 120 may allocate the address region of the frame buffer 600 that stores the screen image data of the second OS 200 in the texture object after receiving the frame buffer complete signal.

The hypervisor 300 obtains the frame buffer complete signal from the GPU 400 in FIG. 8 but embodiments are not limited thereto. For example, a GPU monitoring module of the hypervisor 300 may monitor control information (for example, a GPU register value) of the second OS 200 to determine whether all the rendering result values with respect to the graphic data of the second OS 200 are stored in the frame buffer 600. In this case, the sync module 316 may transmit the frame buffer complete signal to the screen image composing module 120 according to a determination result of the GPU monitoring module.

Alternatively, the hypervisor 300 may provide the frame buffer complete signal to the first OS 100 at a specific time interval. In this case, the hypervisor 300 may further include a timer.

Figure 9:
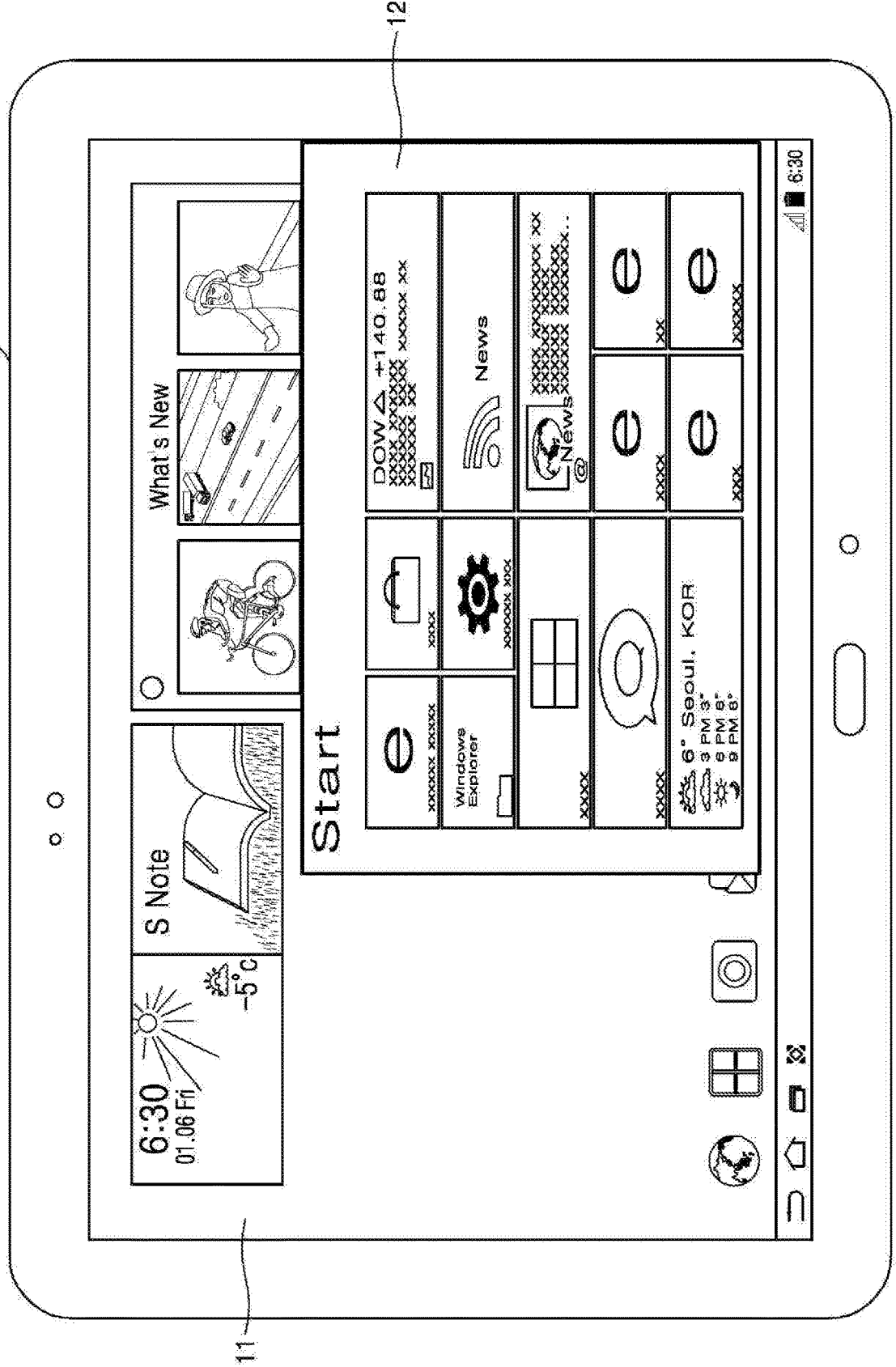
FIG. 9 shows an example in which an electronic apparatus outputs screen image data of a first OS including screen image data of a second OS.

FIG. 9 shows an example in which the electronic apparatus 10 outputs screen image data of the first OS 100 including screen image data of the second OS 200.

Referring to FIG. 9, the electronic apparatus 10 may display the Windows screen image 12 including screen image data of a Windows OS overlaid on the Android screen image 11 including screen image data of an Android OS. In FIG. 9, the Android OS may be the first OS 100 and the Windows OS may be the second OS 200. Accordingly, the Android screen image 11 may be displayed in full screen and the Windows screen image 12 may be displayed in a window (e.g., a sub-window). Also, the Windows screen image 12 may be displayed on the Android screen image 11.

The electronic apparatus 10 may allocate a portion of the Android screen image 11 to the Windows screen image 12. The electronic apparatus 10 may obtain Windows screen image data from the Windows OS and convert a data format of the Windows screen image data into a data format that may be processed by the Android OS.

Also, the electronic apparatus 10 may determine a location and a size of the Windows screen image 12 that is to be displayed. For example, the Android OS may determine the location and the size of the Windows screen image 12 that is to be displayed by using control information (for example, control information for outputting Windows screen image data) obtained from the Windows OS.

The electronic apparatus 10 may output the Android screen image 11 including the Windows screen image 12 based on the determined location and size.

Figure 10:
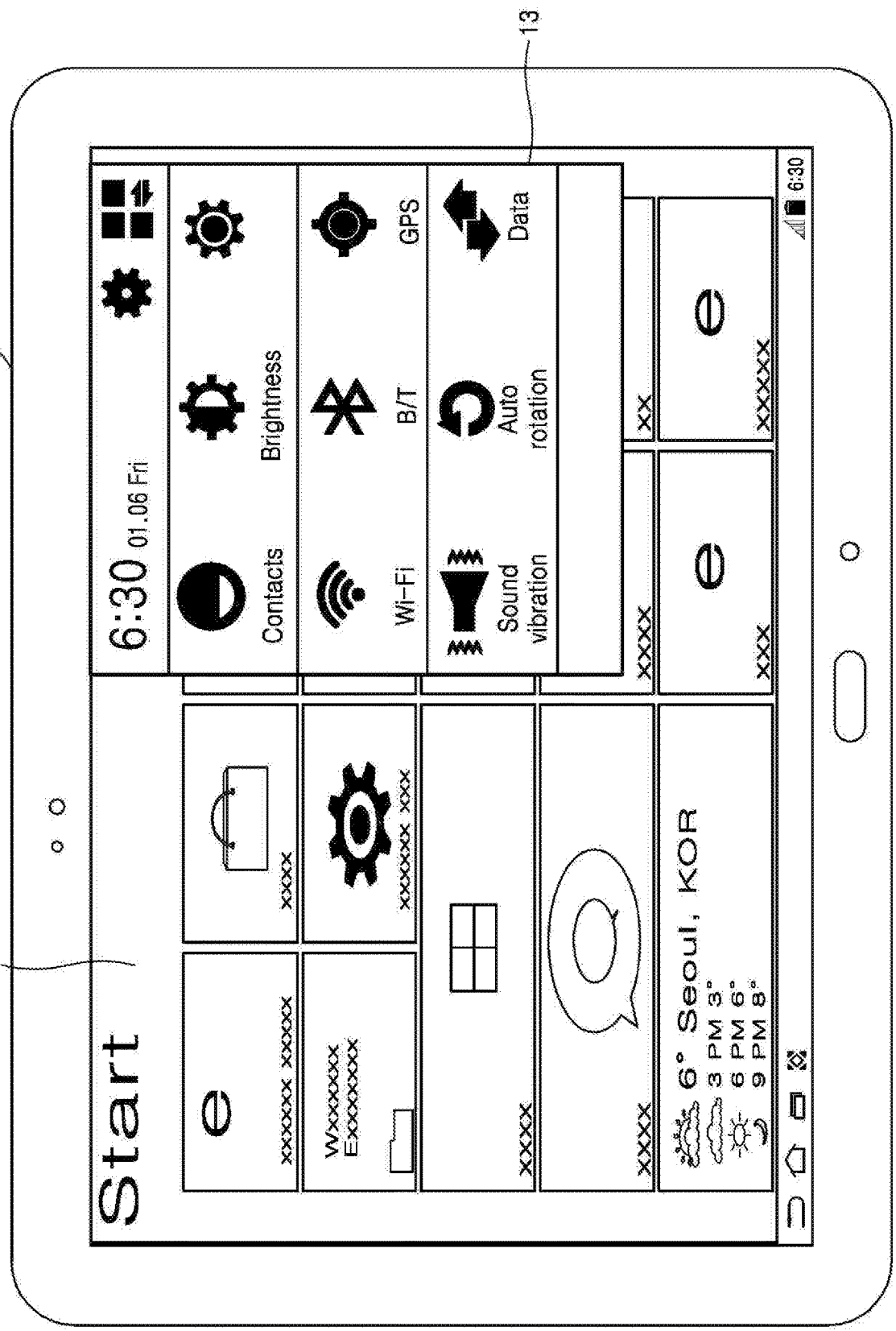
FIG. 10 shows another example in which an electronic apparatus outputs screen image data of a first OS including screen image data of a second OS.

FIG. 10 shows another example in which the electronic apparatus 10 outputs screen image data of the first OS 100 including screen image data of the second OS 200.

Referring to FIG. 10, the electronic apparatus 10 may display the Windows screen image 12 and a notification area 13 at the same time. In FIG. 10, a Windows OS may be the first OS 100 and an Android OS may be the second OS 200. Accordingly, the Windows screen image 12 may be displayed in full screen, and the notification area 13 may be displayed on a portion of the Windows screen image 12. The notification area 13 may represent a settings screen that is used in the Android OS. Also, the notification area 13 may appear on or disappear from the screen according to a user input.

Figure 11:
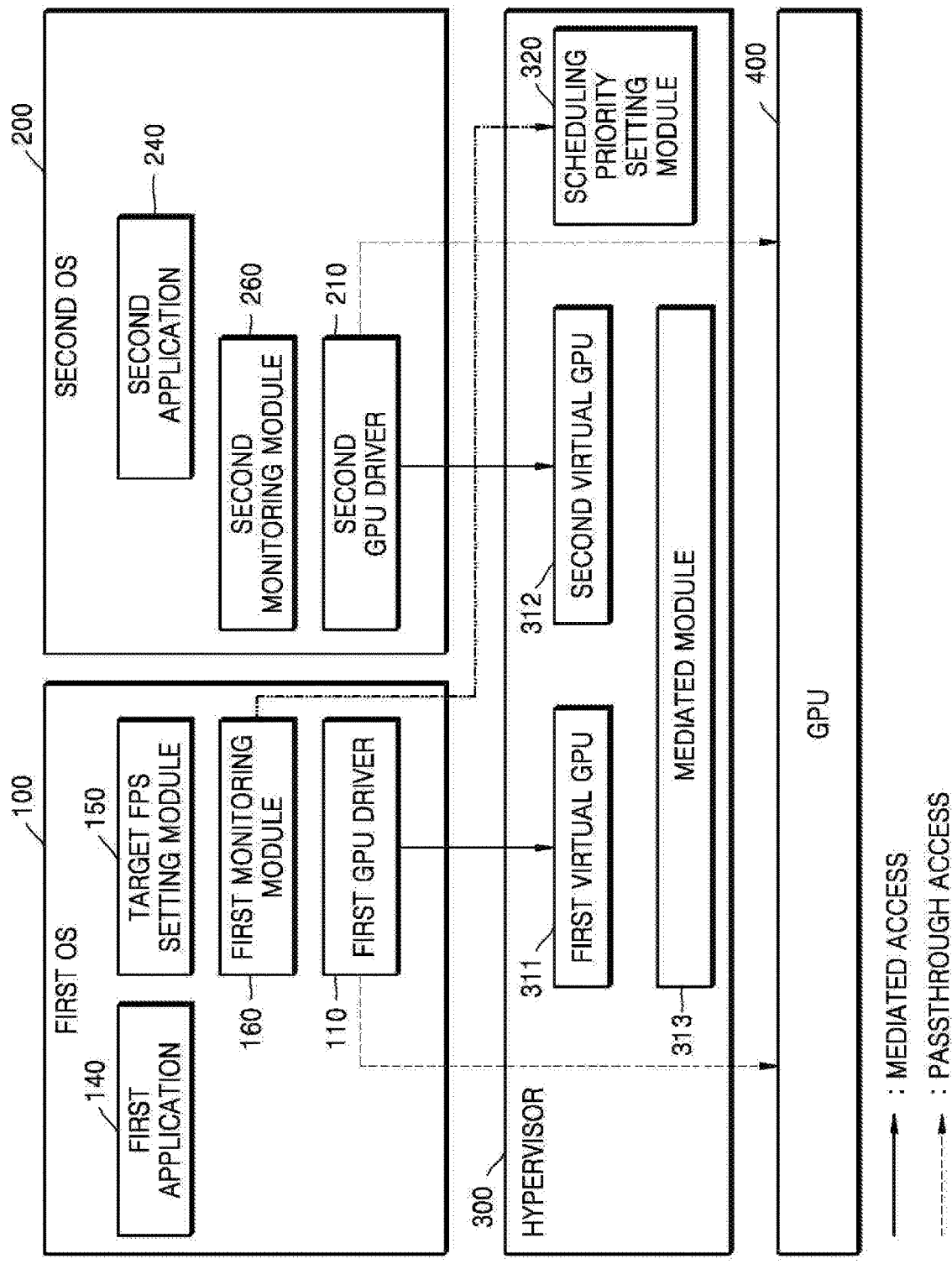
FIG. 11 is a block diagram for explaining an operation in which an electronic apparatus determines a scheduling priority of a GPU according to an exemplary embodiment.

FIG. 11 is a block diagram for explaining an operation in which the electronic apparatus 10 determines a scheduling priority of the GPU 400 according to an exemplary embodiment.

Referring to FIG. 11, the electronic apparatus 10 may generate screen image data of the first OS 100 and screen image data of the second OS 200 at different refresh rates in consideration of workload of OSs. For convenience of description, a refresh rate of screen image data will be described in terms of frames per second (FPS).

According to an aspect of an exemplary embodiment, the electronic apparatus 10 may adjust an FPS of an OS by comparing a target FPS set for each OS with a current FPS.

The first OS 100 may include a first application 140, a target FPS setting module 150, and a first monitoring module 160. The second OS 200 may include a second application 240 and a second monitoring module 260. Also, the hypervisor 300 may further include a scheduling priority setting module 320. The scheduling priority setting module 320 may be included in the mediated module 313. Also, the target FPS setting module 150 is included in the first OS 100 in FIG. 11 but embodiments are not limited thereto. Each of a plurality of OSs included in the electronic apparatus 10 may include the target FPS setting module 150.

The first application 140 may be an application program of the first OS 100 requiring processing of graphic data. The second application 240 may be an application program of the second OS 200 requiring processing of graphic data.

The target FPS setting module 150 may set a target FPS for each OS or application in response to a user input received from an input interface of the electronic apparatus 10. Alternatively, the target FPS setting module 150 may set the target FPS based on a requirement of an OS installed in the electronic apparatus 10 or an application that is being currently executed by each OS. For example, a target FPS of an OS that is currently executing a movie playback application may be set to be high, and a target FPS of an OS that is currently executing a web browser application may be set to be relatively low. Set FPS information may be transmitted to the scheduling priority setting module 320.

The first and second monitoring modules 160 and 260 may monitor a current FPS of each OS or a current FPS of each application that is being currently executed by each OS. The first and second monitoring modules 160 and 260 may transmit monitoring results to the scheduling priority setting module 320.

The scheduling priority setting module 320 may adjust a current FPS of an OS by comparing a target FPS of the OS with a current FPS. For example, if a target FPS of the first OS 100 is lower than the current FPS thereof, the scheduling priority setting module 320 may lower a priority of the first OS 100. Alternatively, if the target FPS of the first OS 100 is higher than the current FPS thereof, the scheduling priority setting module 320 may increase the priority of the first OS 100. In other words, the scheduling priority setting module 320 may adjust a GPU scheduling priority of each OS such that a FPS of each OS coincides with a target FPS thereof.

The mediated module 313 may control the GPU 400 according to the priority determined by the scheduling priority setting module 320. Thus, the GPU 400 may generate a result value obtained by preferentially processing graphic data of a high priority OS and re-using graphic data of a low priority OS.

Figure 12:
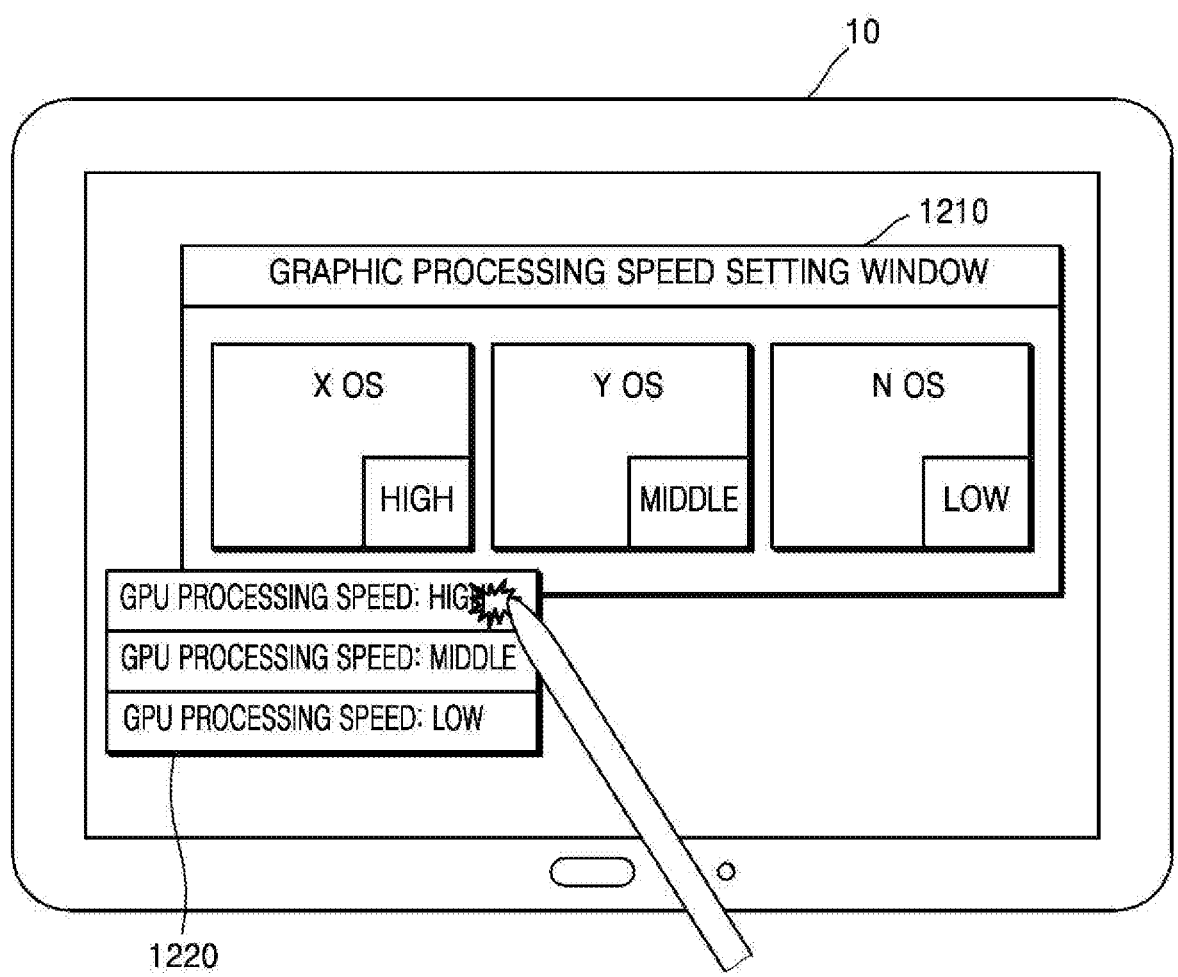
FIG. 12 is a block diagram of an example of providing a user interface for setting a GPU scheduling priority of OSs.

FIG. 12 is a block diagram of an example of providing a user interface (UI) for setting a GPU scheduling priority of OSs.

Referring to FIG. 12, the electronic apparatus 10 may provide a graphic processing speed setting window 1210 including identification values X OS, Y OS, and N OS of executable OSs and a UI 1220 for receiving a user input to determine a GPU processing speed. The electronic apparatus 10 may determine the GPU scheduling priority of OSs in response to a user input with respect to the UI 1220.

In this regard, the UI 1220 may be a pop-up window according to the user input. For example, if the electronic apparatus 10 receives a user input to select one of the identifiers for X OS, Y OS, and N OS, the electronic apparatus 10 may output the UI 1220. Also, if the electronic apparatus 10 receives the user input to determine the GPU processing speed through the UI 1220, the electronic apparatus 10 may adjust a scheduling priority of an OS corresponding to the selected OS identification value.

The electronic apparatus 10 provides the graphic processing speed setting window 1210 including identifiers of OSes in FIG. 12 but embodiments are not limited thereto. For example, the electronic apparatus 10 may provide a graphic processing speed setting window including an identifier of an application and provide a UI to determine a GPU processing speed for each application. When the GPU processing speed for each application is determined, the electronic apparatus 10 may determine the GPU scheduling priority of an OS according to an application that is being currently executed by the OS.

Figure 13:
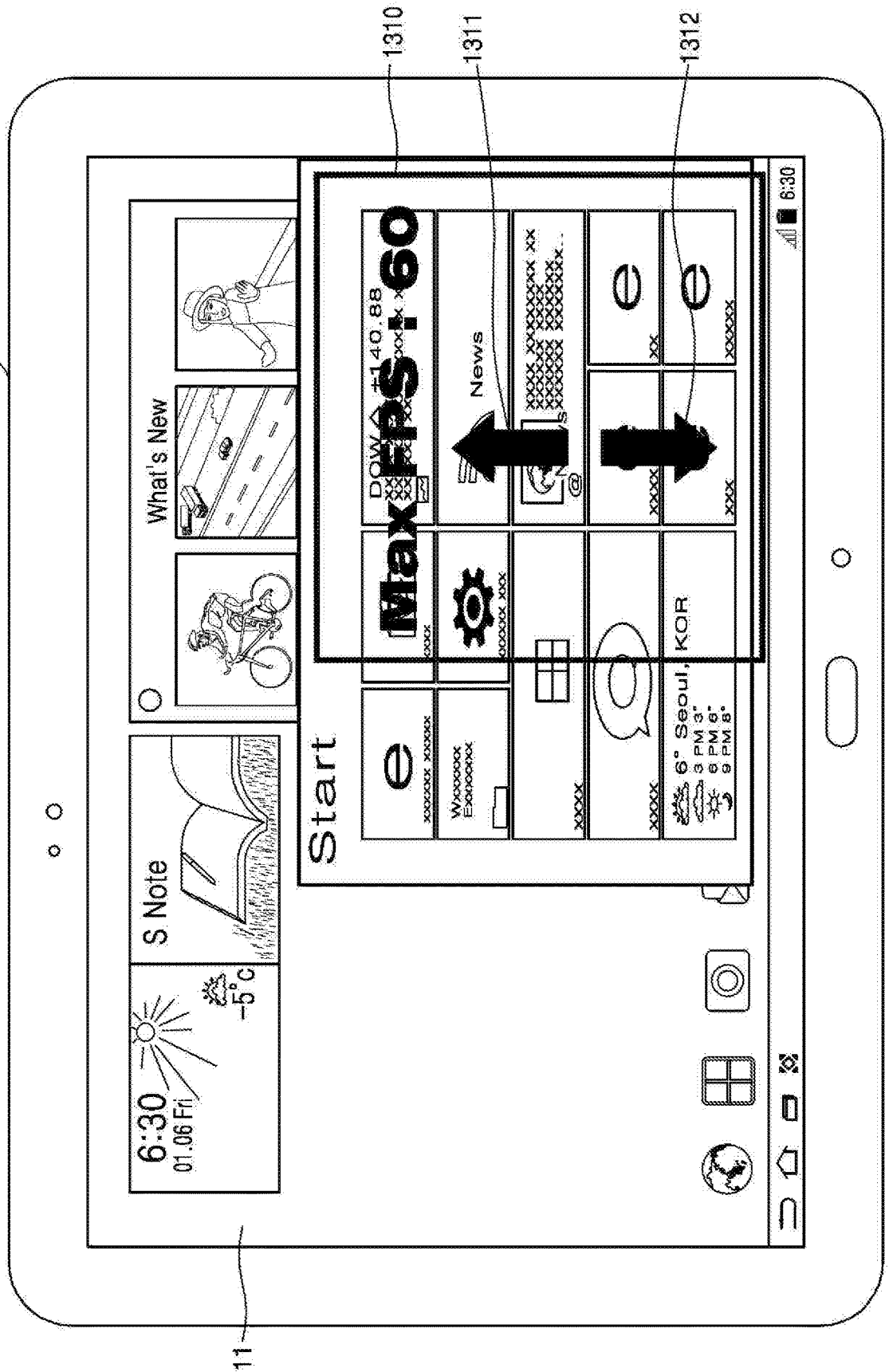
FIG. 13 is a block diagram of another example of providing a user interface for setting a GPU scheduling priority of OSs.

FIG. 13 is a block diagram of another example of providing a UI for setting a GPU scheduling priority of OSs.

Referring to FIG. 13, the electronic apparatus 10 may adjust an FPS of an OS (or an application) by providing a pop-up UI 1310 to a user. For example, the electronic apparatus 10 may provide a hot key or a shortcut key for adjusting the FPS of the OS that is being currently executed in the foreground. The electronic apparatus 10 may provide the pop-up UI 1310 for adjusting the FPS of an OS (or the application) if a user input with respect to the hot key or the shortcut key is received.

Also, the pop-up UI 1310 may include arrow signs 1311 and 1312 for adjusting the FPS. Thus, the electronic apparatus 10 may increase or reduce the FPS of the OS or the application in response to user inputs with respect to the arrow signs 1311 and 1312 of the pop-up UI 1310.

Figure 14:
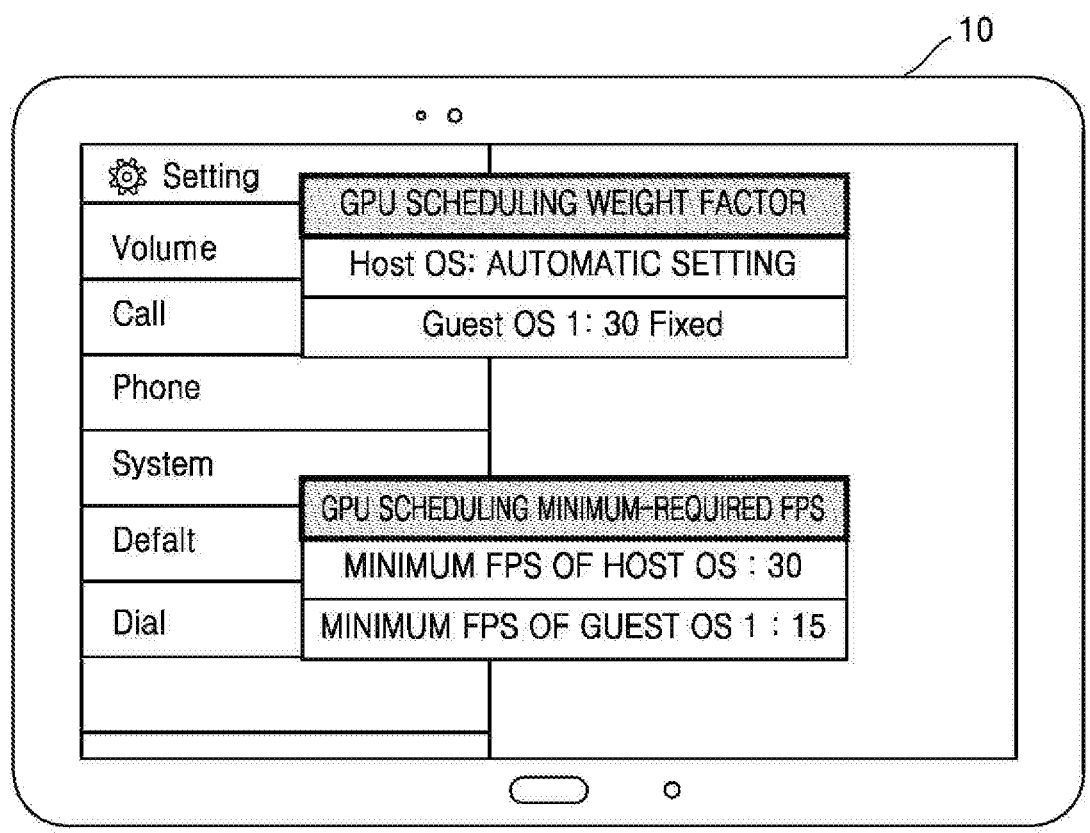
FIG. 14 is a schematic view for explaining an example of adjusting an FPS of each OS by using a setting window of each OS.

FIG. 14 is a schematic view for explaining an example of adjusting an FPS of each OS by using a setting window of each OS.

Referring to FIG. 14, the electronic apparatus 10 may set an FPS of a guest OS (for example, the second OS 200) on a setting window of a host OS (for example, the first OS 100). For example, the electronic apparatus 10 may provide items for setting a GPU scheduling minimum required FPS of each of the first and second OSs 100 and 200. In FIG. 14, a minimum FPS of the first OS 100 may be set as 30, and a minimum FPS of the second OS 200 may be set as 15.

Also, the electronic apparatus 10 may provide items for setting a GPU scheduling weight of each of the first and second OSs 100 and 200. In FIG. 14, the first OS 100 may be set as automatic setting, and the second OS 200 may be set as 30 fixed.

If the electronic apparatus 10 provides the items through a screen, the user may change setting values by using an input unit such as a touchscreen, a virtual keyboard, a voice, a gesture, or the like.

Figure 15:
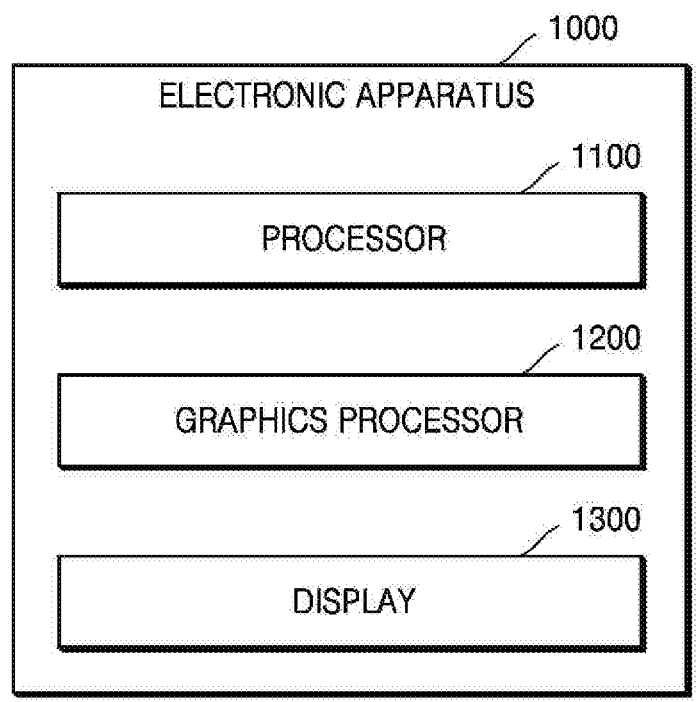
FIG. 15 is a block diagram of an electronic apparatus according to an exemplary embodiment.

FIG. 15 is a block diagram of an electronic apparatus 1000 according to an exemplary embodiment.

Referring to FIG. 15, the electronic apparatus 1000 may include a processor 1100, a graphics processor 1200, and a display 1300.

The processor 1100 may drive a plurality of OSs, a hypervisor, various types of modules, a driver, etc. that are illustrated in the previous drawings. Accordingly, matters related to the plurality of OSs, the hypervisor, the various types of modules, the driver, etc. that are illustrated in the previous drawings are equally applied to the processor 1100 of FIG. 15.

The processor 1100 may generate screen image data of the second OS 200 from graphic data of the second OS 200. For example, the processor 110 may control the graphic processor 1200, thereby generating the screen image data of the second OS 200 from the graphic data of the second OS 200. Also, the processor 1100 may allow the first OS 100 to obtain at least one of control information related to the screen image data of the second OS 200 and memory mapping information. Also, the processor 110 may convert the screen image data of the second OS 200 into graphic data of the first OS 100. For example, the processor 1100 may generate a texture object of the first OS 100 corresponding to the screen image data of the second OS 200 by using address information of a frame buffer that stores the screen image data of the second OS 200. Also, the processor 1100 may generate screen image data of the first OS 100. For example, the processor 1100 may generate the screen image data of the first OS 100 by controlling the graphics processor 1200.

Also, the processor 1100 may control the display to display the generated screen image data of the first OS 100.

Also, the processor 1100 may control a period by which screen image data of each OS is renewed (e.g., refresh rate) to be different according to a workload of each OS or a user input. For example, the processor 1100 may determine a GPU scheduling priority of an OS by using a target FPS set for each OS and a current FPS of the OS. The processor 1100 may adjust a period by which screen image data of each application is renewed according to a workload of each application or a user input.

The graphics processor 1200 may correspond to a GPU illustrated in the previous drawings. The graphics processor 1200 may generate screen image data under control of the processor 1100. For example, the graphics processor 1200 may store the generated screen image data in a frame buffer and provide a frame buffer complete signal to the processor 1100 or the display 1300.

The display 1300 may display screen image data under control of the processor 1100. For example, the display 1300 may output the screen image data stored in the frame buffer.

When the display 1300 is configured as a touch screen having a layer structure with a layer structure, the display 1300 may be used as an input device in addition to an output device. For example, the display 1300 may sense a stylus pen, a finger's touch, a long touch, tapping, etc. and output sensing result to the processor 1100. The processor 1100 may control the display 1300 to display a pop-up window for setting a refresh rate (e.g., an FPS) of an OS or an application based on the sensing result of the display 1300.

FIGS. 16 through 20 are flowcharts of a method of operating the electronic apparatus 10 according to an exemplary embodiment. The method of operating the electronic apparatus 10 shown in FIGS. 16 through 20 relates to the exemplary embodiments described with reference to FIGS. 1 through 15 described above. Thus, although omitted, the descriptions provided with reference to FIGS. 1 through 15 above may be applied to operations of devices of FIGS. 16 through 20. The operations outlined with reference to FIGS. 16 through 20 are exemplary and can be implemented in any combination thereof, including combinations that exclude, add, or modify certain steps.

Figure 16:
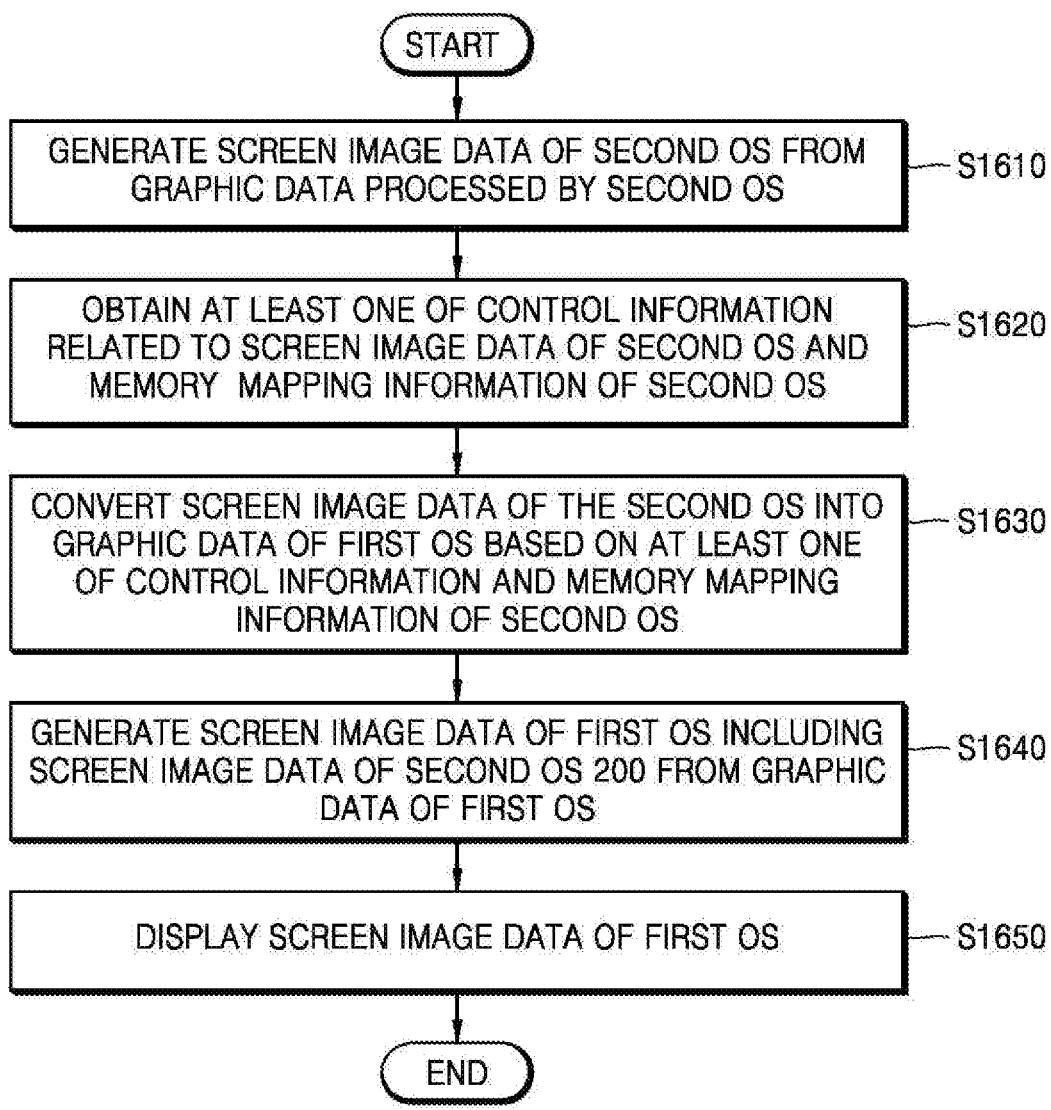
FIG. 16 is a flowchart of a method of operating an electronic apparatus according to an exemplary embodiment.

FIG. 16 is a flowchart of a method of operating the electronic apparatus 10 according to an exemplary embodiment. Hereinafter, for convenience of description, the electronic apparatus 10 may execute the first OS 100 operating as a host OS and the second OS 200 operating as a guest OS but the exemplary embodiment may execute three or more OSs. When the electronic apparatus 10 drives three or more OSs, third through Nth OSs may perform operations identical or similar to the second OS 200 as guest OSs.

Referring to FIG. 16, in operation S1610, the electronic apparatus 10 may generate screen image data of the second OS 200 from graphic data processed by the second OS 200.

The graphic data may include, for example, vertex data, texture data, etc. but is not limited thereto. Also, the screen image data may include pixel data that may be output on a screen. The electronic apparatus 10 may not directly output the graphic data on the screen and may generate the screen image data from the graphic data by using, for example, the GPU 400, etc.

The electronic apparatus 10 may generate control information related to the graphic data processed by the second OS 200 and the screen image data of the second OS 200. The control information related to the screen image data may include control information for generating the screen image data from the graphic data and control information for outputting the generated screen image data.

The electronic apparatus 10 may directly provide the graphic data of the second OS 200 from the second OS 200 to the GPU 400 (i.e. a pass-through access), and the control information related to the screen image data to the GPU 400 through the hypervisor 300 (i.e. a mediated access).

The electronic apparatus 10 may manage the control information related to the screen image data of the second OS 200 obtained from the second OS 200, for example, by the hypervisor 300. Thus, the electronic apparatus 10 may generate the screen image data of the second OS 200 from the graphic data of the second OS 200 directly provided to the GPU 400 based on the control information of the second OS 200 provided to the GPU 400 through the hypervisor 300.

In operation S1620, the first OS 100 of the electronic apparatus 10 may obtain at least one of the control information related to the screen image data of the second OS 200 and memory mapping information of the second OS 200. The memory mapping information may include whole or part of a page table of an OS.

The electronic apparatus 10 may provide at least one of the control information related to the screen image data and the memory mapping information of the second OS 200 to the first OS 100 through the hypervisor 300. For example, if the screen image data of the second OS 200 is generated, the electronic apparatus 10 may not output the generated screen image data but provide the control information related to the screen image data and the memory mapping information of the second OS 200 to the first OS 100.

Alternatively, the first OS 100 of the electronic apparatus 10 may directly obtain the control information and the memory mapping information of the second OS 200 from the second OS 200. For example, the first OS 100 may hook the second OS 200 to access the GPU 400 and/or the display 1300.

In operation S1630, the electronic apparatus 10 may convert the screen image data of the second OS 200 into graphic data of the first OS 100 based on at least one of the control information and the memory mapping information of the second OS 200.

The electronic apparatus 10 may obtain address information of a memory region (for example, a frame buffer) that stores the screen image data of the second OS 200 based on at least one of the control information and the memory mapping information of the second OS 200. Also, the electronic apparatus 10 may generate a texture object of the first OS 100 corresponding to the memory region that stores the screen image data of the second OS 200 by using the address information in which the screen image data of the second OS 200 is stored. In this regard, the texture object may be generated after the first OS 100 receives a signal indicating that the screen image data of the second OS 200 is wholly stored in the memory region.

The electronic apparatus 10 may transform a format of the texture object when a data format of the memory region that stores the screen image data of the second OS 200 is different from a data format of a memory region that is to store the screen image data of the first OS 100.

In operation S1640, the electronic apparatus 10 may generate the screen image data of the first OS 100 including the screen image data of the second OS 200 from the graphic data of the first OS 100.

The electronic apparatus 10 may transmit the graphic data of the first OS 100 including the texture object corresponding to the screen image data of the second OS 200 to the GPU 400 to generate the screen image data of the first OS 100 including the screen image data of the second OS 200. In this regard, control information for generating the screen image data of the first OS 100 may be provided to the GPU 400 through the hypervisor 300.

In operation S1650, the electronic apparatus 10 may display the screen image data of the first OS 100.

If the GPU 400 generates the screen image data of the first OS 100, the electronic apparatus 10 may provide control information for outputting the screen image data of the first OS 100 to the display 1300. In this regard, the screen image data of the first OS 100 may be stored in a frame buffer of the first OS 100. Thus, the electronic apparatus 10 may display the screen image data of the first OS 100 stored in the frame buffer based on the control information provided to the display 1300 through the hypervisor 300.

Figure 17:
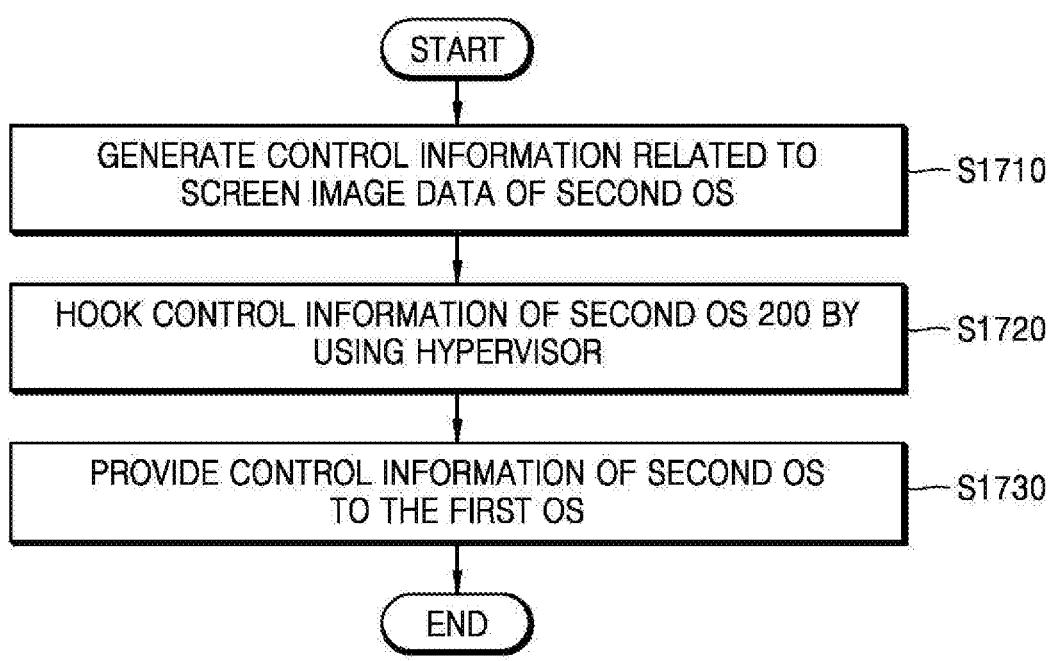
FIG. 17 is a flowchart for explaining a method in which an electronic apparatus provides control information related to screen image data of a second OS to a first OS according to an exemplary embodiment.

FIG. 17 is a flowchart for explaining a method in which the electronic apparatus 10 provides control information related to screen image data of the second OS 200 to the first OS 100 according to an exemplary embodiment.

Referring to FIG. 17, in operation S1710, the electronic apparatus 10 may generate control information related to screen image data of the second OS 200. For example, the electronic apparatus 10 may generate the control information including a GPU register value (for example, an address value of a frame buffer, etc.), GPU scheduling information, a display register value, display scheduling information, etc.

In operation S1720, the electronic apparatus 10 may hook the control information of the second OS 200 by using the hypervisor 300.

The electronic apparatus 10 may control the hypervisor 300 to hook access of the second OS 200 to approach the GPU 400. Also, the electronic apparatus 10 may hook memory mapping information of the second OS 200 by using the hypervisor 300.

In operation S1730, the electronic apparatus 10 may provide the control information of the second OS 200 to the first OS 100. Also, the electronic apparatus 10 may provide the memory mapping information of the second OS 200 to the first OS 100.

Figure 18:
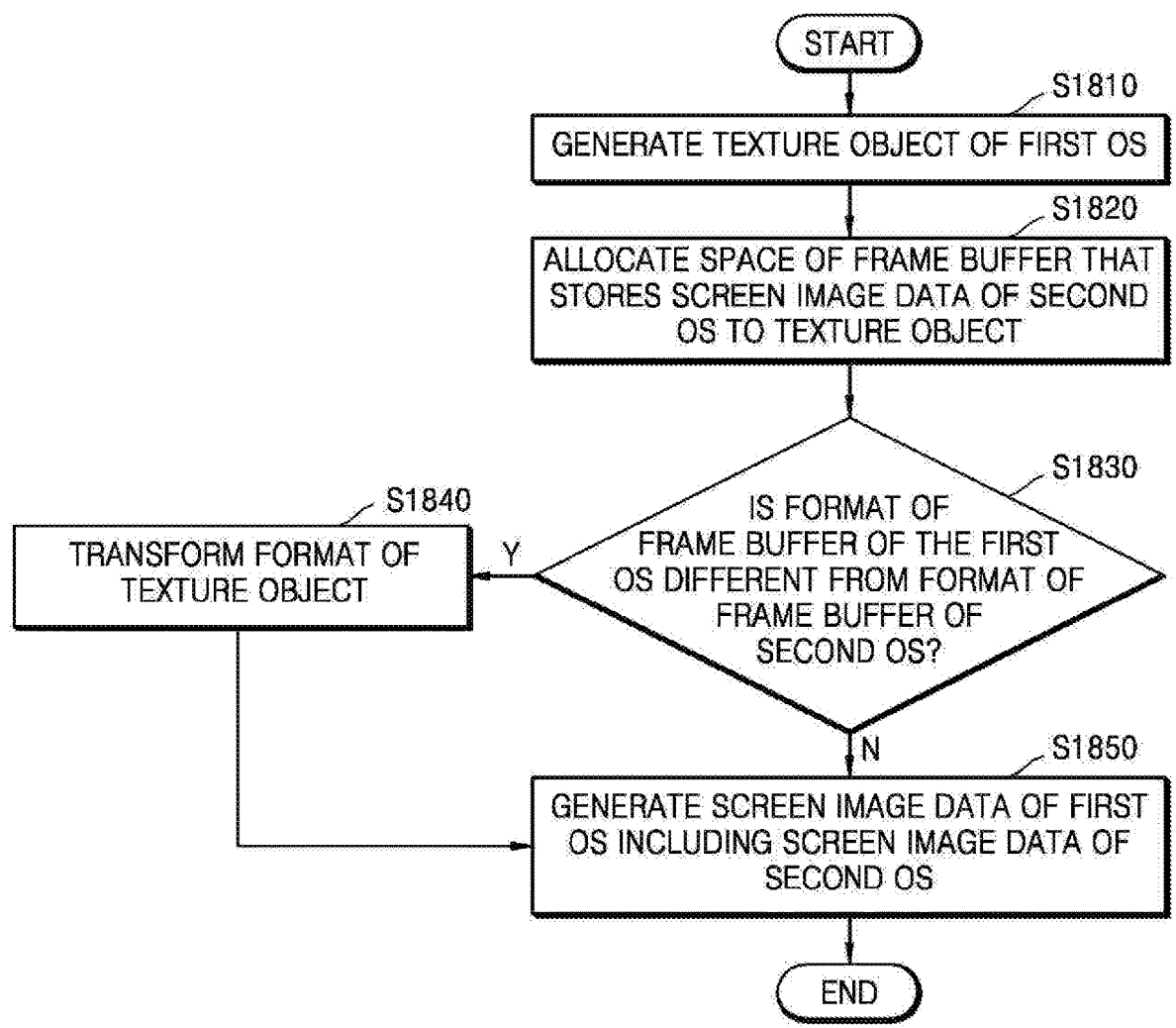
FIG. 18 is a flowchart for explaining a method in which an electronic apparatus converts screen image data of a second OS into graphic data of a first OS according to an exemplary embodiment.

FIG. 18 is a flowchart for explaining a method in which the electronic apparatus 10 converts screen image data of the second OS 200 into graphic data of the first OS 100 according to an exemplary embodiment.

Referring to FIG. 18, in operation S1810, the electronic apparatus 10 may generate a texture object of the first OS 100.

In operation S1820, the electronic apparatus 10 may allocate a storage space, for example, a space of a frame buffer, that stores screen image data of the second OS 200 to the texture object.

The electronic apparatus 10 may obtain address information of a region of the frame buffer that stores the screen image data of the second OS 200 from control information of the second OS 200. For example, the electronic apparatus 10 may obtain the address information of the region from a GPU register value.

Also, the electronic apparatus 10 may convert the obtained address information into an address system of the first OS 100 based on memory mapping information of the second OS 200.

Also, the electronic apparatus 10 may allocate the space of the frame buffer that stores the screen image data of the second OS 200 to the generated texture object by using the obtained address information. In this regard, the first OS 100 may include authorization information for accessing the frame buffer of the second OS 200. Information about the texture object may be provided to the GPU 400.

Also, the electronic apparatus 10 may determine a size and a location of the texture object that is to be output by using the control information (for example, control information for outputting the screen image data of the second OS 200) of the second OS 200 or user input information.

In operation S1830, the electronic apparatus 10 may determine whether a format of a frame buffer of the first OS 100 is different from a format of the frame buffer of the second OS 200. If the format of the frame buffer of the first OS 100 is different from the format of the frame buffer of the second OS 200, in operation S1840, the electronic apparatus 10 may transform a format of the texture object.

For example, the frame buffer of the second OS 200 may store the screen image data thereof in format X, and the first OS 100 may support format Y. In this case, the electronic apparatus 10 may transform the format of the texture object to format Y but is not limited thereto. For example, the electronic apparatus 100 may transform the format of the texture object to format X to move data to the frame buffer of the first OS 100.

If the format of the frame buffer of the first OS 100 is the same as the format of the frame buffer of the second OS 200, the electronic apparatus 10 may proceed to perform operation S1850.

In operation S1850, the electronic apparatus 10 may generate screen image data of the first OS 100 including the screen image data of the second OS 200.

Figure 19:
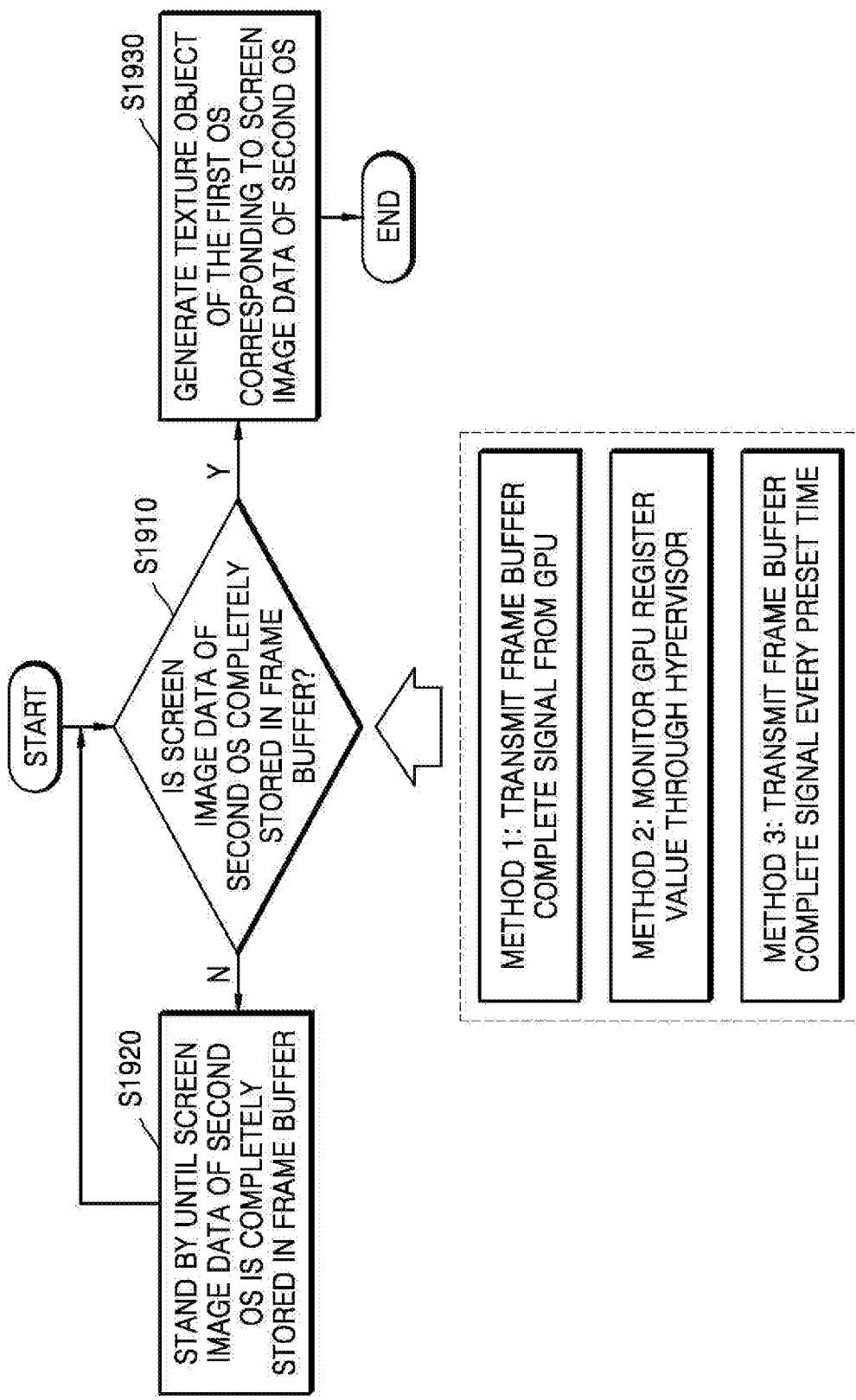
FIG. 19 is a flowchart for explaining a method in which an electronic apparatus determines a time point to convert screen image data of a second OS into graphic data of a first OS according to an exemplary embodiment.

FIG. 19 is a flowchart for explaining a method in which the electronic apparatus 10 determines a time point to convert screen image data of the second OS 200 into graphic data of the first OS 100 according to an exemplary embodiment.

Referring to FIG. 19, in operation S1910, the electronic apparatus 10 may determine whether the screen image data of the second OS 200 is completely stored in a frame buffer. The electronic apparatus 10 may determine whether the screen image data of the second OS 200 is completely stored in the frame buffer by using one of the three methods described below.

According to the first method, the electronic apparatus 10 may determine whether the screen image data of the second OS 200 is completely stored in the frame buffer based on a frame buffer complete signal provided from the GPU 400.

According to the second method, the electronic apparatus 10 may determine whether the screen image data of the second OS 200 is completely stored in the frame buffer by monitoring a GPU register value through the hypervisor 300.

According to the third method, the electronic apparatus 10 may determine whether the screen image data of the second OS 200 is completely stored in the frame buffer at predetermined time intervals.

According to determination results of one of the above methods, in operation S1920, the electronic apparatus 10 may stand by (e.g., wait) until the screen image data of the second OS 200 is completely stored in the frame buffer. Alternatively, according to determination results of one of methods 1 through 3, in operation S1930, the electronic apparatus 10 may generate a texture object of the first OS 100 corresponding to the screen image data of the second OS 200.

Figure 20:
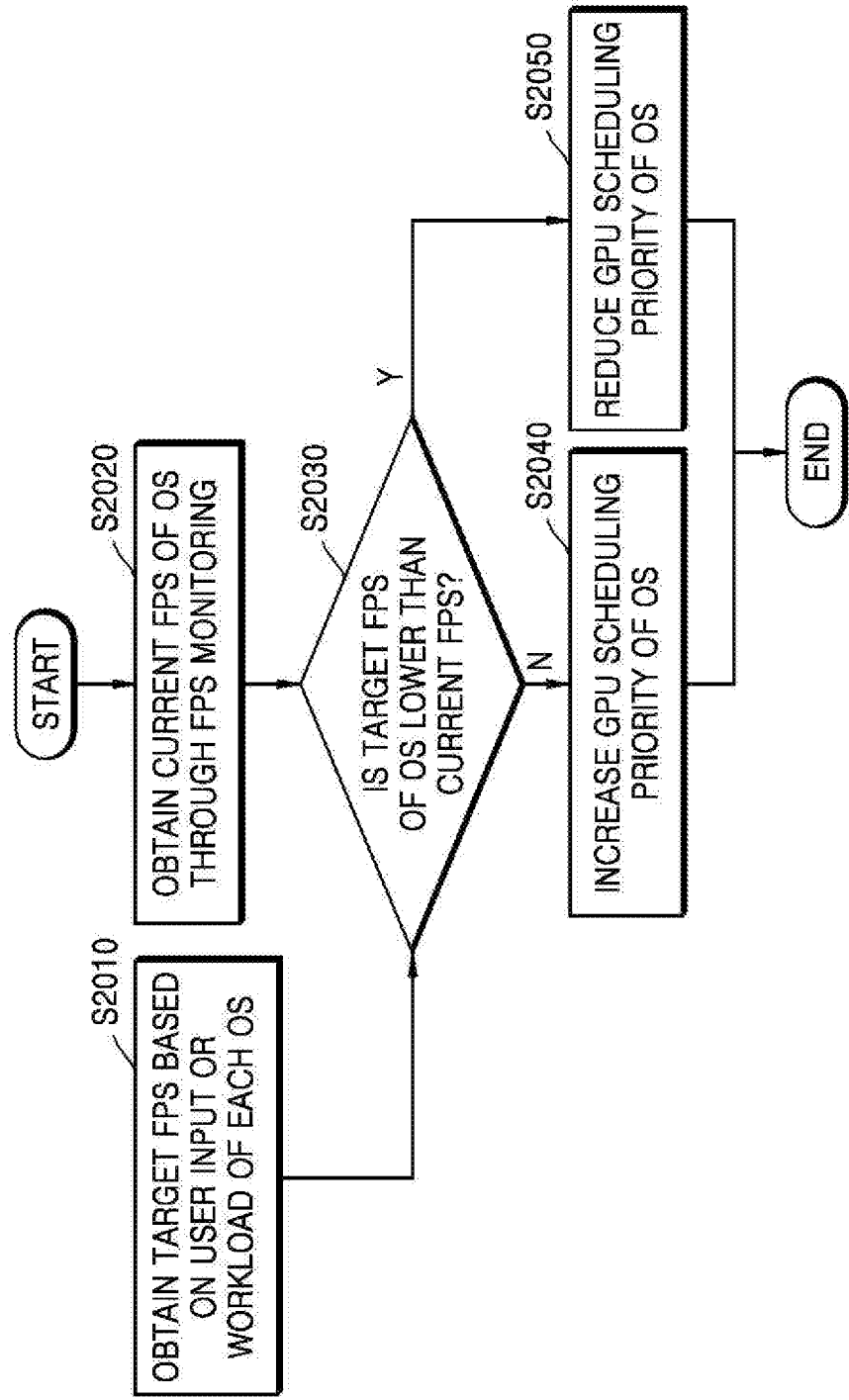
FIG. 20 is a flowchart for explaining a method in which an electronic apparatus adjusts a screen image data refresh rate (e.g., per second (FPS)) of each OS according to an exemplary embodiment.

FIG. 20 is a flowchart for explaining a method in which the electronic apparatus 10 adjusts a screen image data refresh rate (e.g., a FPS) of each OS. For convenience of description, the refresh rate may be expressed in FPS.

Referring to FIG. 20, in operation S2010, the electronic apparatus 10 may obtain a target FPS based on a user input or a workload of each OS. For example, a moving picture application or a game application may require a high FPS. Thus, the electronic apparatus 10 may set the target FPS in consideration of an application that is being currently executed by an OS.

In operation S2020, the electronic apparatus 10 may obtain a current FPS of the OS through FPS monitoring.

In operation S2030, the electronic apparatus 10 may determine whether the target FPS of the OS is lower than the current FPS. If the target FPS of the OS is lower than the current FPS, in operation S2050, the electronic apparatus 10 may reduce a GPU scheduling priority of the OS. However, if target FPS of the OS is greater than the current FPS, in operation S2040, the electronic apparatus 10 may increase the GPU scheduling priority of the OS.

Also, the electronic apparatus 10 may determine the target FPS according to a user input or a requirement of an application executed by the OS, compare the determined target FPS and the current FPS, and adjust the GPU scheduling priority of the OS.

The apparatuses described herein may include a processor, a memory for storing program data to be executed, a permanent storage unit such as a disk drive, a communications interface for handling communication with external devices, and user interface devices, including a touch panel, keys, buttons, etc. When software modules or algorithms are involved, these software modules may be stored as program instructions or computer-readable code executable by a processor on a computer-readable medium. Examples of the computer-readable recording medium include magnetic storage media (e.g., read-only memory (ROM), random access memory (RAM), floppy disks, hard disks, etc.), and optical recording media (e.g., CD-ROMs, or Digital Versatile Discs (DVDs)). The computer-readable recording medium can also be distributed over network-coupled computer systems so that the computer-readable code is stored and executed in a distributive manner. This media can be read by the computer, stored in the memory, and executed by the processor.

Exemplary embodiments of the present disclosure may be described in terms of functional block components and various processing steps. Such functional blocks may be realized by any number of hardware and/or software components configured to perform the specified functions. For example, exemplary embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the exemplary embodiments described herein may be implemented with any programming or scripting language such as C, C++, Java, assembly language, or the like, with the various algorithms being implemented with any combination of data structures, objects, processes, routines or other programming elements. Functional aspects may be implemented in algorithms that are executed on one or more processors. Furthermore, the exemplary embodiments described herein could employ any number of conventional techniques for electronics configuration, signal processing and/or control, data processing and the like. The words "mechanism," "element," "means," and "configuration" are used broadly and are not limited to mechanical or physical embodiments, but can include software routines in conjunction with processors, etc.

The particular implementations shown and described herein are illustrative examples and are not intended to otherwise limit the scope of the present disclosure in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical apparatus.

The use of the terms "a," "an," "the," and similar referents in the context of describing the exemplary embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. Embodiments are not limited to the described order of the steps. The use of any and all examples, or exemplary language (e.g., "such as") provided herein, is intended merely to better illuminate the inventive concept and does not pose a limitation on the scope of the inventive concept unless otherwise claimed. The word "exemplary" is used herein to mean "serving as an example or illustration." Any aspect or design described herein as "exemplary" is not necessarily to be construed as preferred or advantageous over other aspects or designs. Moreover, claim language reciting "at least one of" a set indicates that one member of the set or multiple members of the set satisfy the claim. Numerous modifications and adaptations will be readily apparent to one of ordinary skill in the art without departing from the spirit and scope.

The exemplary embodiments should be considered in descriptive sense only and not for purposes of limitation. Descriptions of features or aspects within each embodiment should typically be considered as available for other similar features or aspects in other exemplary embodiments.

While exemplary embodiments have been particularly shown and described, it will be understood by those of ordinary skill in the art that various changes in form and details may be made therein without departing from the spirit and scope of the inventive concept as defined by the following claims.

What is claimed is:

1. A method of simultaneously displaying execution screen images of a plurality of operating systems (OSs) executed by an electronic apparatus, the method comprising:
   obtaining screen image data of at least one guest OS among the plurality of OSs based on graphic data of the at least one guest OS processed by the at least one guest OS;
   obtaining, by a host OS among the plurality of OSs, at least one of control information related to the screen image data of the at least one guest OS or memory mapping information of the at least one guest OS;
   converting the screen image data of the at least one guest OS into graphic data of the host OS based on the at least one of the control information or the memory mapping information;
   generating screen image data of the host OS based on the graphic data of the host OS, the screen image data of the host OS comprising the screen image data of the at least one guest OS, wherein the host OS determines a location and a size of the screen image data of the at least one guest OS to be displayed in the screen image data of the host OS using the control information; and
   displaying the screen image data of the host OS comprising the screen image data of the at least one guest OS based on the determined location and the determined size,
   wherein the screen image data of the at least one guest OS and the screen image data of the host OS are stored in a frame buffer and the frame buffer identifies a region for storing the screen image data of the host OS as a first region and a region for storing the screen image data of the at least one guest OS as a second region, and
   wherein the host OS has authorization information for accessing the second region of the frame buffer and copies the screen image data of the at least one guest OS stored in the second region of the frame buffer to the first region to generate screen image data of the host OS comprising the screen image data of the at least one guest OS.

2. The method of claim 1, wherein the converting the screen image data of the at least one guest OS comprises:
   obtaining address information of the second region for storing the screen image data of the at least one guest OS based on the at least one of the control information or the memory mapping information; and
   generating a texture object of the host OS, the texture object corresponding to the second region for storing the screen image data of the at least one guest OS based on the obtained address information.

3. The method of claim 2, wherein the converting the screen image data of the at least one guest OS further comprises:
   transforming a format of the texture object in response to a data format of the second region for storing the screen image data of the at least one guest OS being different from a data format of the first region for storing the screen image data of the host OS.

4. The method of claim 2, wherein the texture object is generated after the host OS receives a signal indicating that the screen image data of the at least one guest OS is completely stored in the second region.

5. The method of claim 1, wherein the at least one of the control information or the memory mapping information is provided from the at least one guest OS to the host OS through a hypervisor.

6. The method of claim 1, wherein the screen image data of the host OS and the screen image data of the at least one guest OS are renewed at different refresh rates based on at least one of a workload of each of the plurality of OSs or a user input value.

7. The method of claim 1, wherein the displaying the screen image data of the host OS comprises displaying the screen image data of the host OS by using a sub-window.

8. The method of claim 1, wherein the control information related to the screen image data of the at least one guest OS is for at least one of generating the screen image data of the at least one guest OS or outputting the screen image data of the at least one guest OS.

9. The method of claim 1, wherein the memory mapping information comprises at least one of a whole or a part of a page table of the at least one guest OS.

10. An electronic apparatus for executing a plurality of operating systems (OSs), the electronic apparatus comprising:
- a display;
- a graphics processor configured to generate screen image data of at least one guest OS based on graphic data of the at least one guest OS processed by the at least one guest OS among the plurality of OSs; and
- a processor configured to:
  - provide a host OS among the plurality of OSs with at least one of control information related to the screen image data of the at least one guest OS or memory mapping information of the at least one guest OS, and
  - convert the screen image data of the at least one guest OS into graphic data of the host OS based on the at least one of the control information or the memory mapping information,
- wherein the graphics processor is further configured to generate screen image data of the host OS based on the graphic data of the host OS, the screen image data of the host OS comprising the screen image data of the at least one guest OS,
- wherein the host OS determines a location and a size of the screen image data of the at least one guest OS to be displayed in the screen image data of the host OS using the control information,
- wherein the display is configured to display the screen image data of the host OS comprising the screen image data of the at least one guest OS based on the determined location and the determined size,
- wherein the graphics processor further comprises a frame buffer and the frame buffer identifies a region for storing the screen image data of the host OS as a first region and a region for storing the screen image data of the at least one guest OS as a second region, and
- wherein the graphics processor has authorization information for accessing the second region of the frame buffer and copies the screen image data of the at least one guest OS stored in the second region of the frame buffer to the first region to generate screen image data of the host OS comprising the screen image data of the at least one guest OS.

11. The electronic apparatus of claim 10, wherein the processor is further configured to:
- obtain address information of the second region for storing the screen image data of the at least one guest OS based on the at least one of the control information or the memory mapping information; and
- generate a texture object of the host OS, the texture object corresponding to the second region for storing the screen image data of the at least one guest OS based on the obtained address information.

12. The electronic apparatus of claim 11, wherein the processor is further configured to transform a format of the texture object in response to a data format of the second region for storing the screen image data of the at least one guest OS being different from a data format of the first region for storing the screen image data of the host OS.

13. The electronic apparatus of claim 11, wherein the texture object is generated after the host OS receives a signal indicating that the screen image data of the at least one guest OS is completely stored in the second region.

14. The electronic apparatus of claim 10, wherein the processor further comprises a hypervisor,
wherein the at least one of the control information or the memory mapping information is provided from the at least one guest OS to the host OS through the hypervisor.

15. The electronic apparatus of claim 10, wherein the screen image data of the at least one guest OS is pixel data stored in the frame buffer.

16. The electronic apparatus of claim 10, wherein the processor is further configured to renew the screen image data of the host OS and the screen image data of the at least one guest OS at different refresh rates based on at least one of a workload of each of the plurality of OSs or a user input value.

17. A non-transitory computer-readable recording medium having recorded thereon a computer program, which, when executed by a processor, performs a method of simultaneously displaying execution screen images of a plurality of operating systems (OSs) executed by an electronic apparatus, the method comprising:
- obtaining screen image data of at least one guest OS among the plurality of OSs based on graphic data of the at least one guest OS processed by the at least one guest OS;
- obtaining, by a host OS among the plurality of OSs, at least one of control information related to the screen image data of the at least one guest OS or memory mapping information of the at least one guest OS;
- converting the screen image data of the at least one guest OS into graphic data of the host OS based on the at least one of the control information or the memory mapping information;
- generating screen image data of the host OS based on the graphic data of the host OS, the screen image data of the host OS comprising the screen image data of the at least one guest OS, wherein the host OS determines a location and a size of the screen image data of the at least one guest OS to be displayed in the screen image data of the host OS using the control information; and
- displaying the screen image data of the host OS comprising the screen image data of the at least one guest OS based on the determined location and the determined size,
- wherein the screen image data of the at least one guest OS and the screen image data of the host OS are stored in a frame buffer and the frame buffer identifies a region for storing the screen image data of the host OS as a first region and a region for storing the screen image data of the at least one guest OS as a second region, and
- wherein the host OS has authorization information for accessing the second region of the frame buffer and copies the screen image data of the at least one guest OS stored in the second region of the frame buffer to the first region to generate screen image data of the host OS comprising the screen image data of the at least one guest OS.

* * * * *